US008364141B1

(12) United States Patent
Kateley et al.

(10) Patent No.: US 8,364,141 B1
(45) Date of Patent: Jan. 29, 2013

(54) MOBILE PHONE NETWORK MANAGEMENT SYSTEMS

(75) Inventors: Richard Kateley, London (GB); Chris Haines, London (GB); Richard Harris, London (GB); Martin Hunt, London (GB)

(73) Assignee: Actix Limited (GB)

( * ) Notice: Subject to any disclaimer, the term of this patent is extended or adjusted under 35 U.S.C. 154(b) by 0 days.

(21) Appl. No.: 13/352,080

(22) Filed: Jan. 17, 2012

(30) Foreign Application Priority Data

Dec. 14, 2011 (GB) .................................. 1121466.5

(51) Int. Cl.
*H04W 24/00* (2009.01)
(52) U.S. Cl. ...................... 455/423; 455/67.11; 455/424; 455/446; 370/216; 370/241; 370/242; 370/252
(58) Field of Classification Search .................... 455/25, 455/63.4, 67.11, 67.13, 69, 115.1, 115.2, 455/423, 424, 425, 436, 446, 453, 456.1, 455/522, 524, 561, 562.1; 370/216, 229, 370/241, 242, 252, 254, 310.2, 318, 328, 370/331, 332, 338, 352
See application file for complete search history.

(56) References Cited

U.S. PATENT DOCUMENTS

| | | | |
|---|---|---|---|
| 7,881,319 B2 | 2/2011 | Dobson et al. | |
| 7,941,136 B2 | 5/2011 | Reed et al. | |
| 8,032,131 B2 | 10/2011 | Dobson et al. | |
| 8,064,391 B2* | 11/2011 | Kozisek et al. | 370/329 |
| 2004/0259555 A1* | 12/2004 | Rappaport et al. | 455/446 |
| 2004/0266442 A1* | 12/2004 | Flanagan et al. | 455/445 |
| 2009/0111462 A1* | 4/2009 | Krinsky et al. | 455/423 |
| 2009/0257417 A1* | 10/2009 | Allen et al. | 370/338 |
| 2011/0275364 A1* | 11/2011 | Austin et al. | 455/423 |
| 2012/0208562 A1* | 8/2012 | Wilkin et al. | 455/456.3 |

* cited by examiner

*Primary Examiner* — Anthony Addy
(74) *Attorney, Agent, or Firm* — Schwegman Lundberg & Woessner, P.A.

(57) ABSTRACT

A system and methods for maintaining or optimising a mobile phone network by spatially correlating geolocated radio access network (RAN) performance measurement data and geolocated subscriber account data, which in embodiments provides additional technical information on the RAN performance. These data are integrated in a spatial data structure and provided with a spatial querying and data correlation system for identifying, and addressing problem areas of the RAN.

21 Claims, 14 Drawing Sheets

MOBILE PHONE NETWORK MANAGEMENT SYSTEMS

RELATED APPLICATION

This application claims the benefit of priority under 35 U.S.C. Section 119 to United Kingdom Patent Application Serial No. 1121466.5, filed on Dec. 14, 2011, which application is incorporated herein by reference in its entirety.

FIELD OF THE INVENTION

This invention relates to systems, methods and computer program code for maintaining/optimising a mobile phone network.

BACKGROUND TO THE INVENTION

We have previously described techniques for collecting and visualising mobile phone network data (our U.S. Pat. No. 7,830,812, 'Viewpoint', hereby incorporated by reference). More particularly this describes techniques for aggregating network monitoring data into higher level statistics for the automatic reporting and geographical visualisation of performance engineering information (KPIs—Key Performance Indicators) on maps, in such a way as to enable drilling down to low level data, in embodiments down to individual messages. We have also described related techniques for state modelling of mobile devices, and data processing techniques for handling very high throughput data of the type which may be collected from mobile phone networks (our U.S. Pat. No. 7,881,319). We have also described techniques for identifying network areas for optimisation (our U.S. Pat. No. 8,032,131, 'Insight', hereby incorporated by reference), as well as techniques for implementing self-optimising/healing networks (our U.S. Pat. No. 7,941,136), also hereby incorporated by reference. We now describe techniques which build upon and extend these earlier approaches.

There has been an exponential rise in mobile data usage, but there has also been a rise in the number and complexity of the different devices connecting to a mobile network. More generally, troubleshooting networks has become more difficult, and existing technical data can sometimes prove insufficient for solving real-world problems. The inventors, however, have recognised that additional technical data is effectively available from information relating to subscriber accounts, and that this information may effectively be used as a proxy for additional RF data.

SUMMARY OF THE INVENTION

According to the present invention there is therefore provided a system for maintaining or optimising a mobile phone network, the system comprising: a plurality of data feeds including: at least one radio access network (RAN) data feed to receive RAN performance data relating to performance of a radio access network of said mobile phone network over a period of time; wherein said RAN performance data is associated with RAN performance geolocation data, and wherein said RAN performance data and said RAN performance geolocation data together comprise data defining variation in performance of said RAN over a spatial region of coverage of said RAN; at least one subscriber account data feed to receive subscriber account data defining one or more parameters of subscriber accounts of said mobile phone network; wherein said subscriber account data includes subscriber account geolocation data defining physical locations of said subscriber accounts within said region of coverage of said RAN; a spatial data integration system coupled to said data feeds and configured to combine said RAN performance data, said RAN performance geolocation data, said subscriber account data, and said subscriber account geolocation data into an integrated spatial data structure, wherein said integrated spatial data structure is indexed by at least a spatial element identifier and an attribute identifier, said spatial element identifier identifying a geospatial element of said spatial region of coverage of said RAN, said attribute identifier identifying an attribute of said geospatial element, wherein said attribute comprises one or both of an attribute of said RAN performance derived from said RAN performance data and an attribute relating to said RAN performance derived from said subscriber account data; and a querying system, coupled to said spatial data integration system, to receive a spatial query defining a set of said attributes and elements, and in response to query said spatial data integration system and to output response spatial data, wherein said response spatial data comprises data for attributes and geospatial elements comprising at least one said attribute of said RAN performance derived from said RAN performance data and at least one said attribute relating to said RAN performance derived from said subscriber account data; and a spatial correlation system, coupled to said querying system, to correlate said attribute of said RAN performance derived from said RAN performance data and said attribute relating to said RAN performance derived from said subscriber account data, over a spatial region defined by said geospatial elements of said response spatial data.

In embodiments of the system, in effect actual coverage data derived from geolocated subscriber account data is spatially correlated with geolocated radio access network (RAN) performance data to identify problem areas within actual spatial coverage of the network. This correlation may be presented in many ways, but in some preferred implementations is presented graphically, for example as a 'heat map'. By way of example, the geolocated subscriber account data may, in embodiments, comprise 'churn' or account deactivation data, optionally with accompanying information on a reason, more particularly an RF-coverage related reason, for the deactivation. Additionally or alternatively the geolocated subscriber account data may include subscriber complaint data, preferably represented in terms of one or more network KPIs linking a geolocated complaint to a technical aspect of the RAN coverage at that location (or at subscriber account location).

Embodiments of the system also provide the ability for a user to select a spatial location on the map and drill down to the underlying statistics, intermediate data values from which the statistics are derived or even, potentially, individual network messages.

The RAN performance geolocation data may be obtained from a data feed together with the RAN performance data and/or RAN performance geolocation data may be inferred from the inferred from the RAN performance data, for example from measurements in this data such as timing offset data, handover data, signal level date (when combined with propagation/pathloss modelling for the region), and the like.

In embodiments a geospatial element is a data object with spatial properties, for example a polygon or grid rectangle or square defined by its size and location. The skilled person will appreciate that this data element is distinct from its representation in a 2D or 3D visualisation—in embodiments any of a range of different visualisation techniques may be employed. Further, in embodiments a geospatial grid element may have a position in a spatial hierarchy and may, for example, represent an aggregation of other elements defining smaller spatial extents. In embodiments a geospatial element may represent millions of data points aggregated by space and/or time (as described further later). Thus preferably a hierarchical data storage approach is employed to avoid rounding errors data, storing data in terms of re-aggregatable (intermediate) statistics. These data may comprise, for example, sum and count values from which an average value may be derived in addition to, or instead of, the average value itself. This facilitates generating aggregate statistics, as well as drilling down to the underlying data.

In some preferred embodiments the spatial correlation system includes computer code to modify the geospatial data, in particular so that the value of an attribute of one geospatial element is influenced by one or more of its neighbouring elements. For example, the subscriber account data may indicate a low density of subscribers in a particular area and/or a high level of churn of complaints whilst the RAN KPI (Key Performance Indicator) data for the area may indicate a 'green' network status. This can arise where a number of geospatial elements are just below a threshold for reporting an issue, and in such a situation allowing the value of an attribute to be influenced by those in neighbouring geospatial elements can address this problem. More particularly the user may be given the option to allow a grid element to pull in data from those grid elements around it. Optionally this modification may be preceded by a step of removing outlier attribute values from the combination.

As previously mentioned, some preferred implementations include a data visualisation system to visualise a combination of the RAN performance-derived and subscriber account-derived attributes on a shared geospatial map. In embodiments additional spatial data, for example human population density data, may also be combined on this map. The data visualisation system is arranged to display the spatial correlation by displaying the attributes of the response spatial data from the spatial data integration system as overlaid image effects. These may comprise, for example, varying one or more of colour, brightness, contrast, gamma, boundary/edge highlighting and so forth, or a combination of these. In one preferred approach one of the attributes defines an image property such as colour and a second of the attributes defines a transparency of the first property for example by alpha blending. The skilled person will appreciate, however, that alternative approaches may be employed, for example visualising a correlation by the size of a displayed image effect or the size of stipples in a stippled region (which can give an effect equivalent to transparency). In embodiments the geospatial map on which the correlation is displayed may include one or both of terrain and buildings, which is technically helpful in understanding the relationship between RAN performance data and the RF propagation environment.

In preferred embodiments the querying system comprises a user interface for defining a query for the spatial data integration system. Preferably this incorporates a visual query tool which enables the user to define a spatial query by identifying a region of the geospatial map. This is then converted into a spatial query to apply to the spatial data integration system. In embodiments, however, the user interface also enables a user to define a query in terms of one or more logical expressions or rules to be applied to the RAN performance and/or subscriber account data. Preferably the querying system further enables a user to define a "second tier" query, for example in terms of one or more expressions/rules defining one or more further filter parameters to be applied to the output from querying the region defined by the original spatial query. This enables a user to more easily determine, say, the most important issues in a particular, selected spatial region.

Broadly speaking, therefore, the spatial query system identifies in detail a set of elements and attributes which can then be extracted from the spatial data integration system and correlated to identify spatial regions where it is desirable to address network performance problems. Some preferred implementations of the system further include a user-adjustable filter employing a user-definable expression, and having a variable parameter in order to apply a variable image effect to the correlation displayed on the shared geospatial map. For example a user control such as a slider may be provided to enable adjustment of a degree of transparency of one attribute. This facilitates identifying a correlation between attributes displayed on the map.

In embodiments of the system the ability to spatially correlate geolocated RAN performance data and subscriber account-derived data on a shared geospatial map is sufficient to enable an engineer to identify problem areas of the relevant spatial region, picking these out visually. Additionally or alternatively, however, the system may completely automatically process the data to identify problem areas within the region of RAN coverage, for example areas where a performance metric is below a threshold and/or where signal strength is reduced or absent. Examples of performance metrics which may be employed to identify a problem area include: coverage quality, throughout, signal strength (RSCP), interference level (Eclo), voice drop locations, blocked voice calls, failure to handover to GSM, and related service fault/breakdown metrics.

The correlated attributes may be processed by a network performance optimisation system to identify, for predicted problem areas, one or more tasks for improving the performance of the RAN. Such a task may, for example define (the location of) an additional RF transmitter/receiver to use with the mobile phone network. Thus this may define, for example, an additional booster or repeater to add, or an additional base station or picocell or femtocell to add to the RAN, or a WiFi base station/network to use with the RAN to offload traffic to another network or network type, for example WiFi. The task data may additionally or alternatively define one or more parameters of the RAN to adjust, for example for traffic shaping and/or to change any one of the many parameters associated with a base station such as (down) tilt, power, base station splitting and the like. In embodiments this data may be output as problem resolution data. This data may either be provided to the mobile phone network operator or, in embodiments, the data may be provided directly to the mobile phone network for automated resolution of a predicted RAN performance problem.

The geolocated subscriber account data may, in embodiments, describe a number density of subscribers, for example a BAN (Business Account Number) density—which provides basic information on likely RAN performance in a region. However preferably the subscriber account data also includes a parameter defining a deactivation event for a subscriber account, where applicable, optionally together with data indicating the reason for the account deactivation. This latter data may be collected, for example, by means of a tick box to enable subscriber choice of one or more reasons. Where the reason for deactivation is, for example, financial this can be discounted but where the reason is related to the RAN performance, for example because of poor signal availability, dropped calls, interference, or slow data, then this provides useful technical information which may be correlated with geospatially-mapped RAN performance. Additionally or alternatively subscriber complaint data, where available, may be collected and correlated spatially with RAN performance, in general similar reasons for deactivation also giving rise to subscriber complaints. The geolocated subscriber account data may also identify, for example, high value subscribers, to facilitate targeting the RAN performance optimisation towards these particular subscribers (who may be individuals or businesses, potentially with more than one individual phone number).

Embodiments of the system do not directly collect subscriber billing data from the network operator, although this is possible. However relevant data which may be collected by the system may include data defiling into which of one or more categories a subscriber falls. For example a VIP customer may have priority network access under some circumstances. Further such data may also be employed to prioritise predicted problem areas of the RAN coverage, for example to prioritise the resolution of problems in areas of coverage with a high density of VIP customers. Because data is collected and may be spatially processed at a very fine granularity, information relating to subscriber category, for example identifying a VIP subscriber, may be employed to address individual subscriber problems. Thus in embodiments the system is able to identify when (and where) a new transmitter and/or receiver, such as a new picocell or femtocell, should be added to the network to serve an individual VIP subscriber or a small group of VIP subscribers, for example less than 10, 5 or 3 such subscribers.

Optionally the system may incorporate a rules engine to operate on either or both of the data output from the spatial data integration system and the data output from the spatial correlation system, for identifying the problem spatial areas. For example a set of hierarchical rules in our proprietary AXEL (the Actix (RTM) Extensible Expression Language) may be employed (for further details of AXEL reference may be made to our earlier U.S. Pat. No. 7,941,136, incorporated by reference).

One useful aspect of embodiments of the system is the ability to investigate network problem areas geospatially, by a specific device or device type. The type (model) of mobile device on a network is indicated by the TAC (Type Allocation Code), which is part of the IMEI (International Mobile Equipment Identity) code. However subscriber account data may not include IMEI data as subscribers frequently change their mobile device and it is therefore the subscriber identifier or IMSI (International Mobile Subscriber Identity) which is more important from this perspective. Further, although some measurement data provided from the RAN includes IMEI data, not all of the measurement data can be identified in this way. Thus In some preferred embodiments the system maintains a table or other data structure linking a subscriber identifier (IMSI) with an equipment identifier (IMEI), which includes a device type identifier (TAC). In this way the data in the data integration system can be queried by a dimension defining the type of mobile device (handset type), for example to provide handset level information on device-related problems. Such problems may include, for example, data session failures (embodiments of the system may determine data relating to their underlying cause), and problems relating to RSPC (Received Signal Code Power) and Ec/No (Energy per chip to total receive power), to RRC (Radio Resource Control) request types, to RAB (Radio Access Bearer) type breakdowns, and to accessibility, retainability, and mobility. Addressing such problems for specific mobile device types can be important in maintaining and optimising a mobile phone network.

Preferred embodiments of the system store data indexed by time as well as by geospatial location. Thus the RAN performance data may include both 'continuous' data (such as the location of a base station, which is quasi-static) and 'discrete' data, which is time-dependent. In practice the RAN measurement data is time dependent and thus in embodiments the spatial data integration system indexes data by time or time period, and the spatial correlation system is able to perform similar, selective correlations. Preferred embodiments of the spatial data integration system aggregate data over multiple time periods, for example per hour, per day and/or per week, in order to facilitate rapid access to this information (bearing in mind the very large quantities of data involved). Lower frequencies (longer time periods) can be calculated on the fly because of the smaller quantities of data then involved. Typically time data is received as UTC (Coordinated Universal Time) and this is converted to local time for the relevant region of the RAN based on the geolocation data, in particular the longitude of the spatial region to which the RAN performance data relates. This is because local time data is generally more meaningful when troubleshooting network problems.

Embodiments of the system are able to manage data from a radio access network extending over a plurality of different time zones, for example over the entire USA. As will be appreciated, this generates very large quantities of data and in such systems the processing of the spatial data, in particular by the spatial data integration system, may be scheduled by longitude of the RAN performance geolocation data to spread the processing load. Thus in embodiments of the system the processing of the spatial data for integration proceeds from east to west.

In embodiments, to facilitate rapid access to the spatial data in the spatial data integration system a dimension of one attribute may be explicitly labelled as another attribute. Further, some attributes may be calculated on the fly, and are thus 'virtual' in the sense that there is no explicit row in the data structure corresponding to the attribute. Preferably a spatial hierarchy of geospatial elements is also defined. For additional efficiency, in some preferred embodiments the spatial data integration system only generates a data entry for a geospatial element when data is received relating to that element, and thus the spatial coverage is gradually built up in accordance with the data provided to the system rather than initially providing geospatial elements for every region that might potentially be needed.

In a related aspect the invention provides a computer-implemented method of improving coverage of the RAN of a mobile phone networks, the method comprising: inputting subscriber data for subscriber accounts of a plurality of present/past subscribers; inputting geolocated RAN performance data defining a map of one or more quality of service parameters of said RAN over a region of coverage of said RAN of said mobile phone network; combining said geolocated RAN performance data defining said map of said one or more quality of service parameters with said subscriber data; and outputting data predicting problem areas of said coverage of said RAN from said combining, for improving coverage of said RAN in said predicted problem areas.

The geolocated RAN performance data may be comprise RAN performance data provided with accompanying geolocation data and/or geolocation data for the RAN performance data may be derived (in a preceding step) from the RAN performance data, more particularly from measurement data in the RAN performance data.

As previously mentioned, the data for improving coverage of the RAN may identify a parameter of the network to modify and/or an additional RF transmitter and/or receiver to employ with the RAN.

Preferably the subscriber data comprises data mapping subscriber location and deactivation of subscriber accounts. This is then spatially correlated with the RAN performance data mapping one or more quality of service parameters to predict the problem areas.

In some preferred embodiments the subscriber data includes data identifying a value of a subscriber account, albeit without necessarily importing detailed billing information. The method may then further include selecting a predicted problem area for improving coverage in response to values of subscriber accounts in the predicted problem areas. More particularly the method may comprise indentifying the location of a femtocell to add to the RAN to serve one or more individual identified high value subscriber accounts in a particularly location to address a predicted problem for these accounts. Thus the improved coverage of the RAN may able targeted at specific individual subscribers or subscriber accounts (noting that a subscriber account may be a business account associated with more than one user). Thus technical resources to improve the RAN coverage may be directed efficiently to where they can best be utilised.

Additionally or alternatively, however, a spatial mapping of RAN performance may be combined with subscriber value data, for example identifying "VIP" subscribers, to identify areas of poor RAN performance which are used by such VIP subscribers, without necessarily identifying a "home" location of the subscriber accounts.

The invention also provides a computer system for improving coverage of the RAN of a mobile phone networks, the system comprising: an input to receive subscriber data for subscriber accounts of a plurality of present/past subscribers; an input to receive geolocated RAN performance data defining a map of one or more quality of service parameters of said RAN over a region of coverage of said RAN of said mobile phone network; a system to combine said geolocated RAN performance data defining said map of said one or more quality of service parameters with said subscriber data for predicting problem areas of said coverage of said RAN from said combining; and an output to output data from said system to combine said geolocated RAN performance data with said subscriber data.

The invention also provides a system for maintaining or optimising a mobile phone network, the system comprising: a plurality of data inputs including: at least one radio access network (RAN) performance data input to receive performance data relating to performance of a radio access network (RAN) of said mobile phone network, at least one subscriber data input billing data input to receive subscriber data relating to said at least one mobile device, and at least one RAN performance geolocation data input to receive geolocation data for both said RAN performance data and said subscriber data, and at least one subscriber geolocation data input to receive geolocation data for said subscriber data; and a radio access network (RAN) performance optimisation system coupled to said plurality of data inputs, said radio performance optimisation system comprising a rules engine to operate on said RAN performance data, on said subscriber data, on said RAN performance geolocation data, and on said subscriber geolocation data, in accordance with a set of hierarchical rules to identify a portion of parameter space defined by a combination of said RAN performance data, said geolocation data, and said subscriber data, and to output data defining one or more tasks for network optimisation relating to said identified portion of parameter space, a said task comprising a definition of a potential fault, exception, optimisation or improvement of said network to be investigated by a service engineer.

In embodiments the rules are configurable to identify a correlation in space and/or time between the geolocated RAN performance data and the geolocated subscriber data to identify that a new base station is to be added to the RAN. This base station may comprise a booster or repeater, or a pico cell or femtocell base station or a base station of another existing radio network recruited to assist the RAN performance, for example to offload traffic onto a WiFi network.

The invention further provides processor control code to implement the above-described systems and methods, for example on a general purpose computer system. The code is provided on a physical data carrier such as a disk, CD- or DVD-ROM. Code and/or data to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 1:
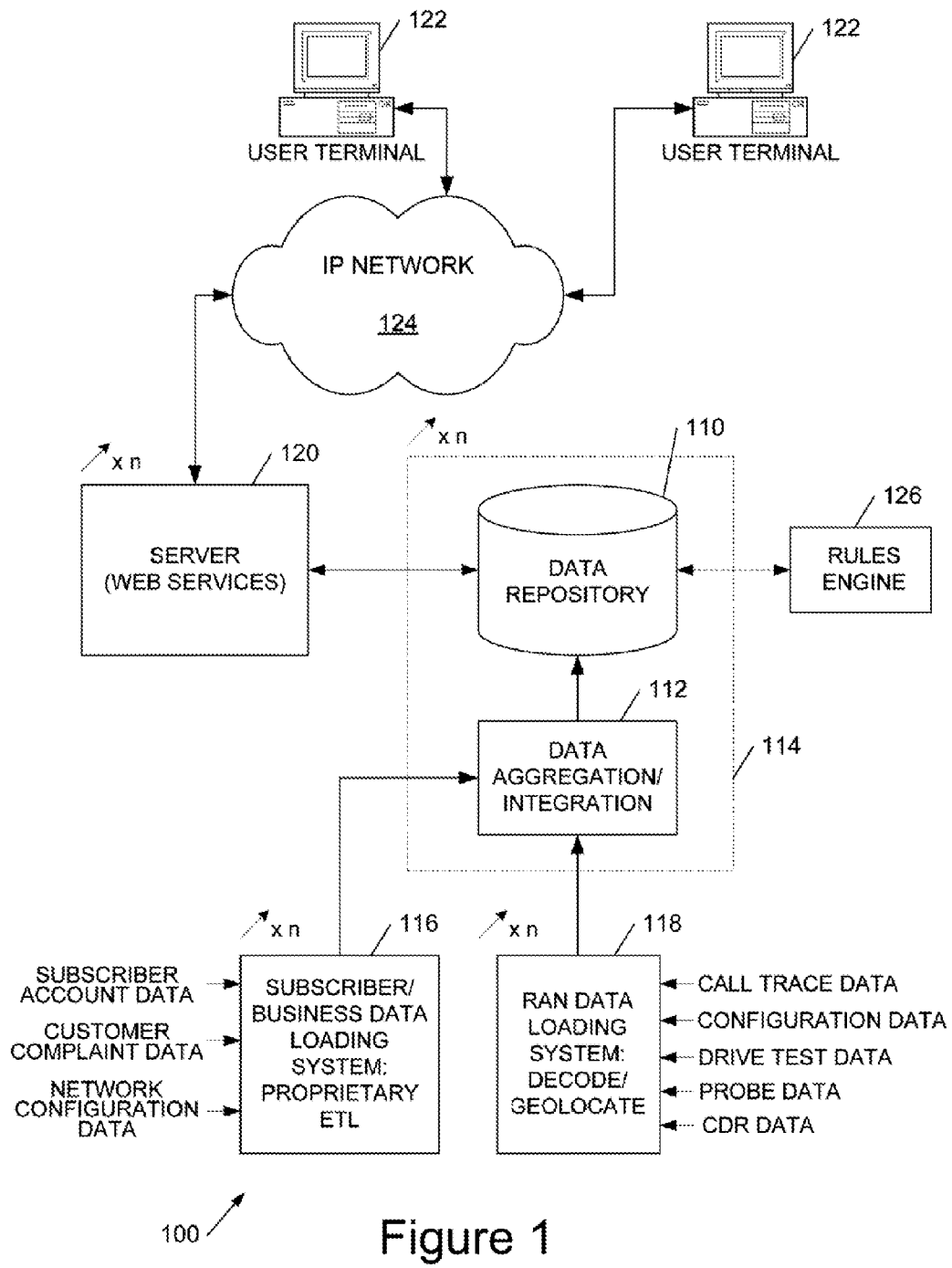
FIG. 1 shows an embodiment of a system for maintaining/optimising mobile phone network performance, according to an embodiment of the invention.

Broadly speaking the systems and methods we will describe employ a spatial database defining a spatial grid to aggregate geolocated subscriber data, for example specifying a latitude/longitude location of a subscriber with radio access network (RAN) performance data from a wide range of sources. In general the geolocation is not precise and thus many, potentially millions, of points are aggregated into grid squares and, in embodiments, smoothed over neighbouring squares. The data is also dimensioned by time and by mobile device/device type, and a pivot-table type approach enables aggregation by selected dimensions of the data, as well as drill-down into the underlying data, avoiding rounding errors by storing sums and counts. The grid information is visualisable to facilitate user identification of priority areas for optimisation, but the data may be employed for automatically scheduling radioengineering tasks, either for service engineers or for direct implementation by a mobile phone network. The database employs spatial data objects ('elements') defined by their location (centre point) and size, optionally in a spatial hierarchy, and these objects have the underlying RAN performance data. Thus although these objects can be visualised, for example in 2D or 3D on a map using an image server, they can also be manipulated in other ways because they are linked to the RAN and subscriber data. For example an object may be attached or linked to an event flag, trouble ticket or engineering task. Since one dimension of the data is time, historical information can be stored, facilitation trending and other time-based analysis.

The time dimension also enables dynamic visualisation of changes of the mapped data over time, for example to correlate signal strength or some other quality of service parameter period-by-period (say, month-by-month) with churn, optionally in a defined spatial region. Flexibility in the visualisation of the data as described further later enables colour representing one parameter, say churn (account deactivation) to be faded in/out by another parameter, for example signal strength. This can provide very useful information to a network operator—continuing the previous example, if churn is observed in areas of good signal strength then signal strength can be ruled out as the cause. Where the data is available, subscriber (business) data may be pre-filtered to remove data indicating churn for financial reasons. Having the subscriber account data also enables other filters to be employed—for example areas with poor RAN performance can be disregarded if there are few or no subscribers in those locations. Correspondingly areas of the RAN coverage which are used by high value subscribers, either because this is their home location or because a set of geolocated mobile devices is filtered by subscriber account value to identity where high value subscribers are using their devices, can be prioritised for improving RAN performance. This approach can be extending to predict subscribers who are likely to churn, in order to take remedial action.

Referring now to FIG. 1, this shows an embodiment of such a system 100 for maintaining/improving a mobile phone network. The system comprises a data repository (database) 110 implemented in Oracle running on a Linux server, optionally including a data layer to provide standardised access to, and presentation of, the data in the database. The database 110 receives data from a data aggregation/integration system 112, the database 110 and aggregation/integration system 112 together providing a spatial data integration and storage system 114. The data aggregation/integration system provides a buffer, with standalone tables to queue the incoming data until this is pulled off into the database tables. In embodiments the data aggregation is scheduled to run hourly, and is processed by time zone of the incoming geolocated data.

The aggregation/integration system 112 receives subscriber/business data from a first loading system 116 and RAN data from a second loading system 118. The data items from systems 116, 118 include location data for the corresponding data items. As illustrated, in practice there may be multiple instances of one or more of systems 114, 116, 118.

The subscriber/business data loading system 116 receives, as general examples of the data categories, subscriber account data, customer complaint data, and optionally network configuration data. This is processed in system 116 by one or more ETL (Extract, Transform and Load) processes. The subscriber account data comprises account location data, for example latitude/longitude co-ordinates of the account for an address of the account holder. Generally this information will include one or more IMSIs, but will not generally include an IMEI. A single account may have a plurality of subscribers, in which case the account data may, among other things, define the number of subscribers. The account data may also include processed billing data, for example identifying an account value and/or merely flagging whether the account is a high value (VIP) account.

The subscriber account data also includes account deactivation event data, preferably accompanied by a reason for the deactivation (which will become an attribute in the database). Example reasons include non-technical reasons such as a financial reason, a customer service reason, or a competitor's marketing campaign, and technical reasons, for example, poor signal availability, dropped or blocked calls, interference, slow data rates (low through put), lack of service and the like. The technical reasons for deactivation of a subscriber account are those which are of particular interest. The customer complaint data may include a similar set of reasons to the deactivation event data.

Optionally server 116 (or another server) may capture network configuration data for the network relating to the configuration and properties of the equipment (network elements) in the physical network such as switches, controllers, sites, BTSs (Base Transceiver Stations), sectors, radios and antennas. This may be extracted from planning tool databases and/or configuration management systems. The data in database 110 may also include site billed data from a 'site build' database, which tracks the status of new and existing sites and includes upgrades to existing equipment such as capacity upgrade. Thus, for example, a 'New Site' event may be detected by system 100 when a site's status changes to 'Integration' in the site build database, indicating that a new site is combining on line.

We refer to data of this general type as 'continuous' since it is quasi-static, changing only infrequently. There are other types of continuous data which may also be incorporated into the system including, for example neighbour configuration data defining neighbour relationships between sectors such as a list of potential handover targets, handover statistics, and parameters controlling handover function. Another type of continuous data which may be incorporated into the system is population data, more particularly population density data defined, for example, as a geolocated, spatially varying value related to the number of people per unit area.

System 118 inputs geolocated or geolocatable data relating to RAN performance. This may be derived from a wide variety of sources including, but not limited to, call trace data, drive test data, probe data, and CDR (Call Detail Record) data. Optionally system 118 may also accept network configuration data more particularly cell location/configuration data relating to cell physical characteristics such as beam width and the like; this may be obtained from a database such as a network operator's planning tool or via a switch itself.

One useful source of RAN performance data is subscriber call trace data which may include RF data (from the RNC or phone) various measurement reports for each call, various protocol messages including layer 3 messaging, and the like. This data may be pushed up to the OSS (Operations and Support System) and output, for example in, separated variable (.csv) format. Other detailed data may be derived from probes, protocol analysers and the like, puling data off one or more network interfaces, for example the Iub interface and the like. Probes and protocol analysers are able to output measurement report and other call record data. Potentially data at any level of the SS7 (Signalling System 7) stack may be employed.

A further potential source of performance data is drive test data, although this is less valuable than actual measurement data and because drive tests are not necessarily representative of actual use, especially indoor use. Still further sources of data include counters and other statistics typically retrievable from an OSS performance management tool, alarm data (for example performance/configuration alerts), and, more generally, any other type of performance data which may be made available in future networks. Broadly speaking we refer to this type of data as 'discrete' data since the data has values that represent a snapshot of an aspect of the RAN at a moment in time (which can include a KPI).

Some of this RAN performance data may be provided with geolocation data. in other instances this data may be geolocated, for example using Actix (RTM) Analyser. As the skilled person will appreciate, there are many techniques which may be employed to geolocate measurement data. For example timing advance information (in a 2G network) or propagation delay (chip count) data in a 3G network may be employed for triangulation. Handover data (including soft handover) data may similarly be employed and, more generally, the captured messaging will often include RF characteristics for all the base stations in or potentially in a call, and this may therefore be employed for geolocation. In addition signal strength data may be combined with planning/path loss modelling (for example, looking up pathloss in a database) may be used to infer location. The DCI (Downlink Control Information) messages, in particular DCI0 also include information which may be employed for geolocation. In general all of this data, together with other call and counter data, provides useful information for inputting geolocated RAN performance data into spatial data integration system 114.

Optionally, application level data may also be input into the system. Thus, for example, DPI (Deep Packet Inspection) techniques may be employed to examine probe-captured data from the network to extract APN (Access Point Name) data which in effect defines a URL (Uniform Resource Locator). This can be used to determine which application or class of applications (for example, email, browsing, voice and/or data streaming and the like) is using the network, to provide additional information to employ in the performance analysis/correlation.

The above described data feeds may relate lo local, national or international subscribers, and thus the subscriber and/or RAN data may include data for roaming mobile devices. In the case of the RAN data, roaming data may be extracted from this data if required. More particularly, Country Code and Network Code data (which identifies the operator) may be extracted from the PLMA (Previous Local Mobility Anchor).

Continuing to refer to FIG. 1, the data integration system 114 is accessed via one or more web servers 120 which, in embodiments, provide a web service-based API which handles communication between user terminals 122 and the database 110 via an IP network 124, for example the Internet or an intranet. In embodiments these application servers are Java-based. These provide access to a number of application objects, for example a network model providing access to site, sector and event objects, as well as user interface components such at attribute tables, event/task navigators map visualisation objects and the like. In particular, however, the system 120 provides objects for spatial data correlation and visualisation as described, further later, and web clients to provide corresponding user interface functions.

An optional rules engine 126 is coupled to the database 110 to apply the logic based on defined rules to the data in the database. This logic is preferably defined in an expression language such as AXEL (see our U.S. Pat. No. 7,941,136, ibic/this enables a user to write rules to define spatial correlation tasks and/or other combinations of RAN and subscriber data and, optionally, to partially or wholly automate a response to an identified problem or predicted problem.

Figure 2:
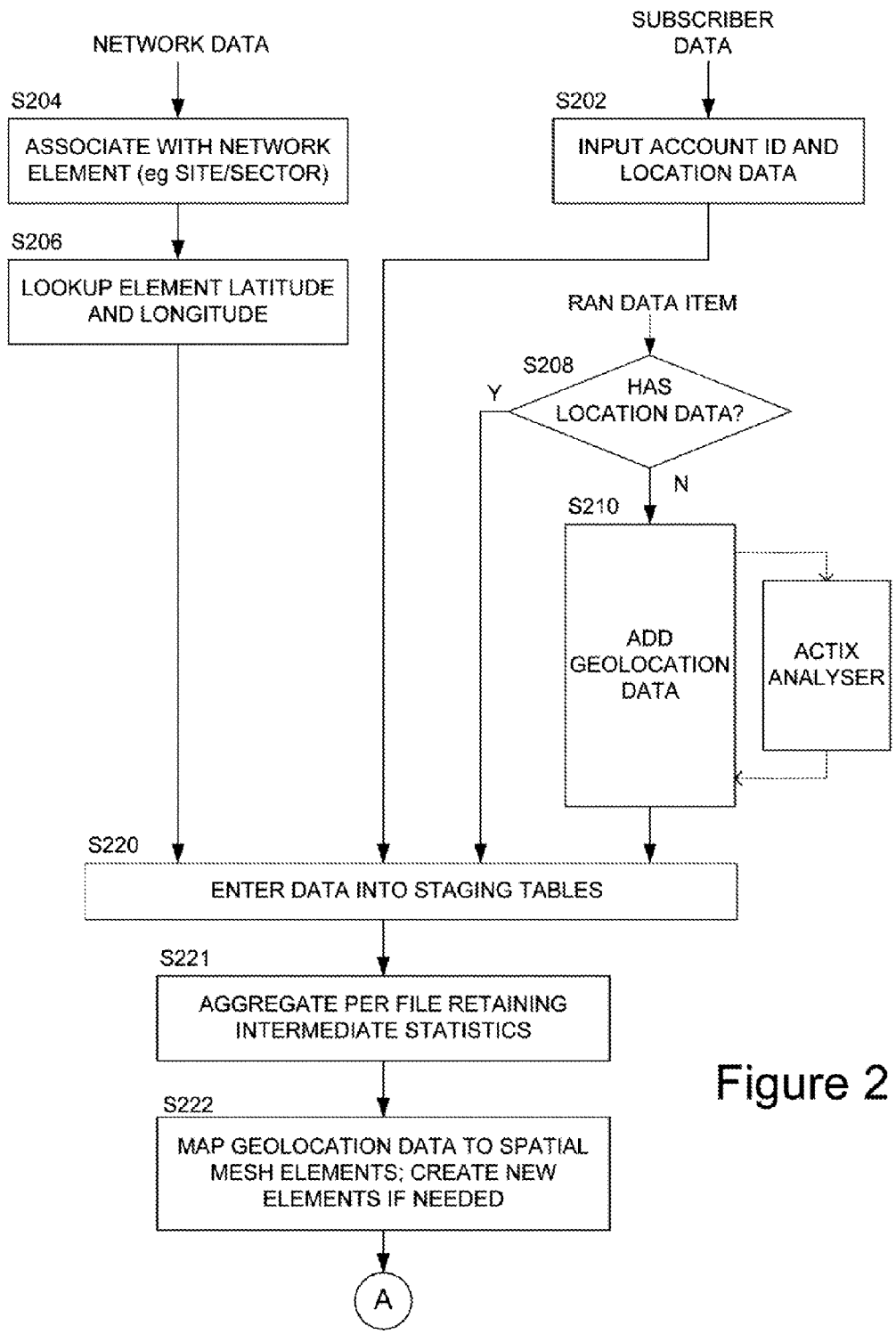
FIG. 2 shows a flow diagram of procedures operating on the system of FIG. 1.
Figure 2:
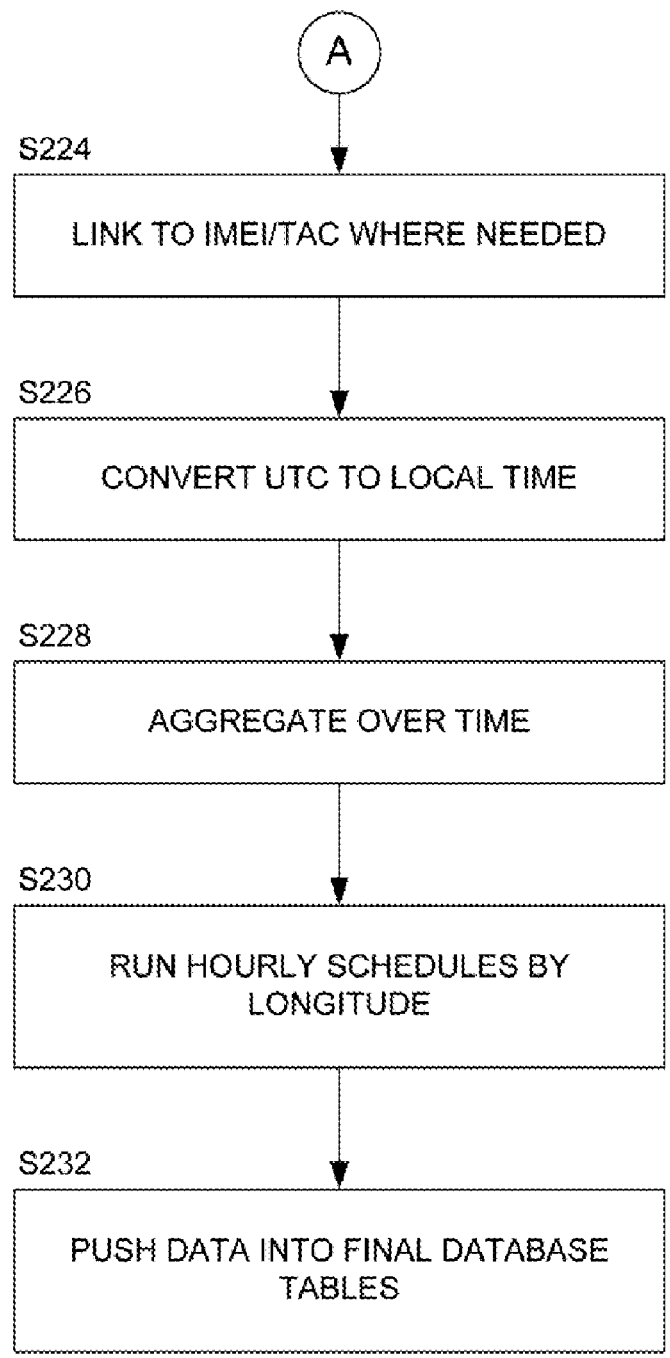

Referring next to FIG. 2 this shows a flow diagram of procedures for entering data into the relational database 110 of FIG. 1. Thus subscriber data is generally, already geolocated so this is input at step 202 and entered into staging tables (S220). In principle, however, location data could be created for subscriber account data such as subscriber value data, for example by geolocating identified subscribers (IMSIs) using the RAN data. network data is typically indexed by network element and thus this is first associated with the network element site/sector (S204) and then this information is used to look up the element latitude and longitude (S206) again prior to entry of the geolocated data into the staging tables (S220).

RAN measurement/performance data, for example call trace data may or may not have associated location data. If location data is present then at step 208 the geolocated RAN data is input into the staging tables. If not geolocation data is added (S210), for example by running the data through Actix Analyser (RTM), prior to entering the data into the staging tables.

Following these initial steps the procedure performs per file aggregation (S221), preferably retaining source or intermediate (sum/count) data to facilitate re-processing. This step may aggregate data over a time period of, for example, a few minutes. The procedure then maps the geolocated data to spatial grid mesh elements (S222), creating new mesh elements if none currently exist to represent data at an identified location. At this point the representation is in terms of grid elements rather than, for example, being arranged by site/sector.

As previously mentioned the subscriber data and in general only some of the RAN measurement data includes an IMEI and preferably, therefore, a table is created from those measurements which do include both the IMEI and IMSI, linking the IMSI to an IMEI, and hence to a TAC code which identifies the user's specific device (S224). This enables correlation of subscriber and RAN data by device type, for example to identify areas where VIP iPhone (RTM) users are experiencing, or are predicted to experience, quality of experience issues.

In general the RAN data will be referenced to UTC and thus preferably the procedure includes step S226 to convert this to local time based on longitude. The system then performs aggregation over time (S228), preferably at multiple levels of granularity, for example at hour level and at day level. The skilled person will appreciate however that in general the subscriber data, for example a count of a number of unique subscribers (IMSIs) is not aggregated over time.

At step S230 hourly and/or daily schedules are run (based on local time) to push the data from the staging tables into the final database tables (S232). In embodiments the schedules are run by longitude (S230) running from east to west. At the day level the schedules may be further split by RNC (Radio Network Controller), taking one RNC at a time.

Optionally database 110 is subject to a weekly or monthly data retention policy, for example discarding or aggregating older data such as, say, data more than 6 months old.

Figure 3:
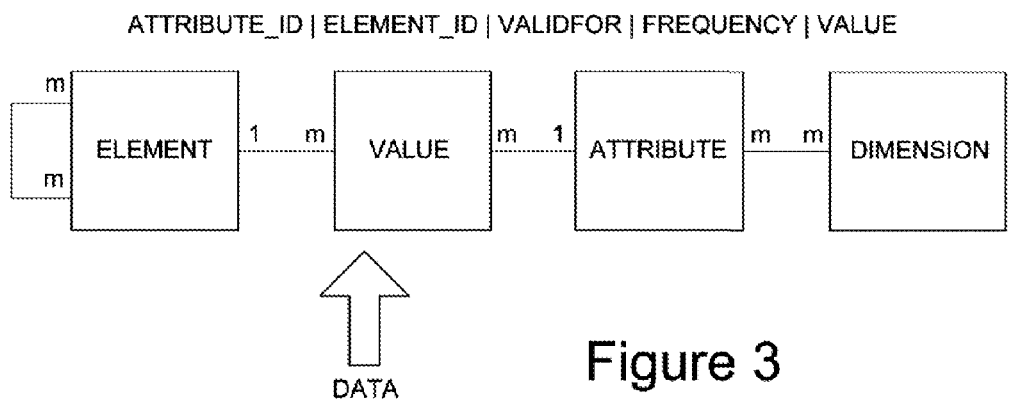
FIG. 3 shows a database structure for the system of FIG. 1.

Referring again to the database (which in embodiments may have multiple instances and/or may be implemented across multiple machines), FIG. 3 illustrates conceptually how data in this database is indexed. Thus a data value is indexed by a spatial element identifier, and also by an attribute identifier (which has multiple dimensions). In addition a time or time period is specified by a frequency value (defining an aggregation period) and a ValidFor value defining which particular period is indexed. This may be expressed as follows;

Attribute_ID|Element_ID|ValidFor|Frequency|Value

The element identifier is a unique identifier of a grid square, which may be an aggregate of smaller grid squares in a spatial hierarchy. The element ID identifies that the grid square is being referenced, and identifies which grid square is referenced. Values are stored in the database against an element identifier. In a similar way the attribute identifier provides a unique identifier for each data item, as well as aggregated data items, linked to enable drill-down, for example dropped calls, by device type. As previously mentioned data items may be discrete or continuous; discrete data items may be aggregated over time, often over multiple different time periods; and there are relationships between the data items. A combination of an attribute and dimension identifies a single attribute; where an attribute identifier has one or more dimensions each dimension is another attribute. In essence, any property of the spatial grid mesh is an attribute with a unique identifier—each stored item corresponds to an attribute, for example dropped call data corresponding to the dropped call attribute. In preferred implementations one attribute may map to another—for example attribute 3 may correspond to attribute 1 dimensioned by 'device type=iPhone'. Using metadata in this way simplifies table access. As previously mentioned, date/time is also an attribute. Some attributes may be calculated, that is there may be no row in the data corresponding to the attribute which is instead calculated as needed. For example a monthly aggregation of data may be calculated attribute. This approach simplifies correlation and facilitates asking questions such as, "where is there high numbered entity of iPhone usage by VIP roamers, with a large number of dropped calls?". When seeking to locate relevant data in a database, what is needed is one or more element identifiers to identify, geographically, the relevant spatial locations together with one or more attribute identifiers to identify what data is required, and optionally for what time period. In principle this approach also enables correlation of data aggregated over different time periods, for example to display some desired combination of monthly data and daily data.

Figure 4:
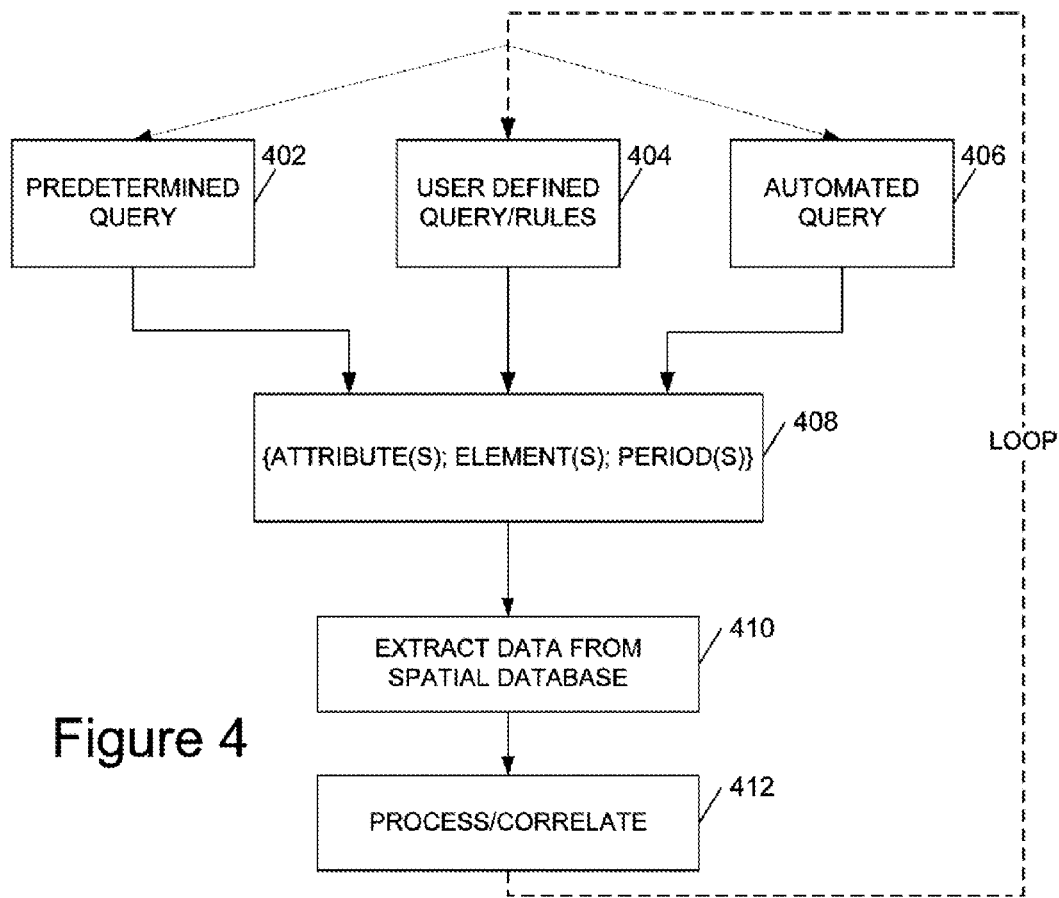
FIG. 4 shows an overview of operation of a querying system for the system of FIG. 1.

Referring next to FIG. 4, this illustrates at a high level a query/correlation process which may be implemented using the system of FIG. 1 to interrogate the stored data. Thus a spatial query is defined resulting in a definition of a set of attributes, elements and optionally time periods 408 which is used to extract 410 data from the spatial database 110 relating to the defined grid squares. This data is then processed 412, more particularly correlated to combine the subscriber account data with the RAN-derived data, and then optionally the initial spatial query is refined and/or an additional query or filter is applied to further refine the data output, as indicated by the dashed loop.

An initial query may comprise one or more of a predetermined query 402, a user-defined query 404, and an automated query 406 (for automatic or semi-automatic optimisation of a network). The user-defined query 404 may comprise a spatial selection of a region of interest, for example defined by a user selecting a region on a map and/or one or more queries defined by user-defined rules or expressions, which may include on or more rules to select a spatial region of interest.

Figure 5A:
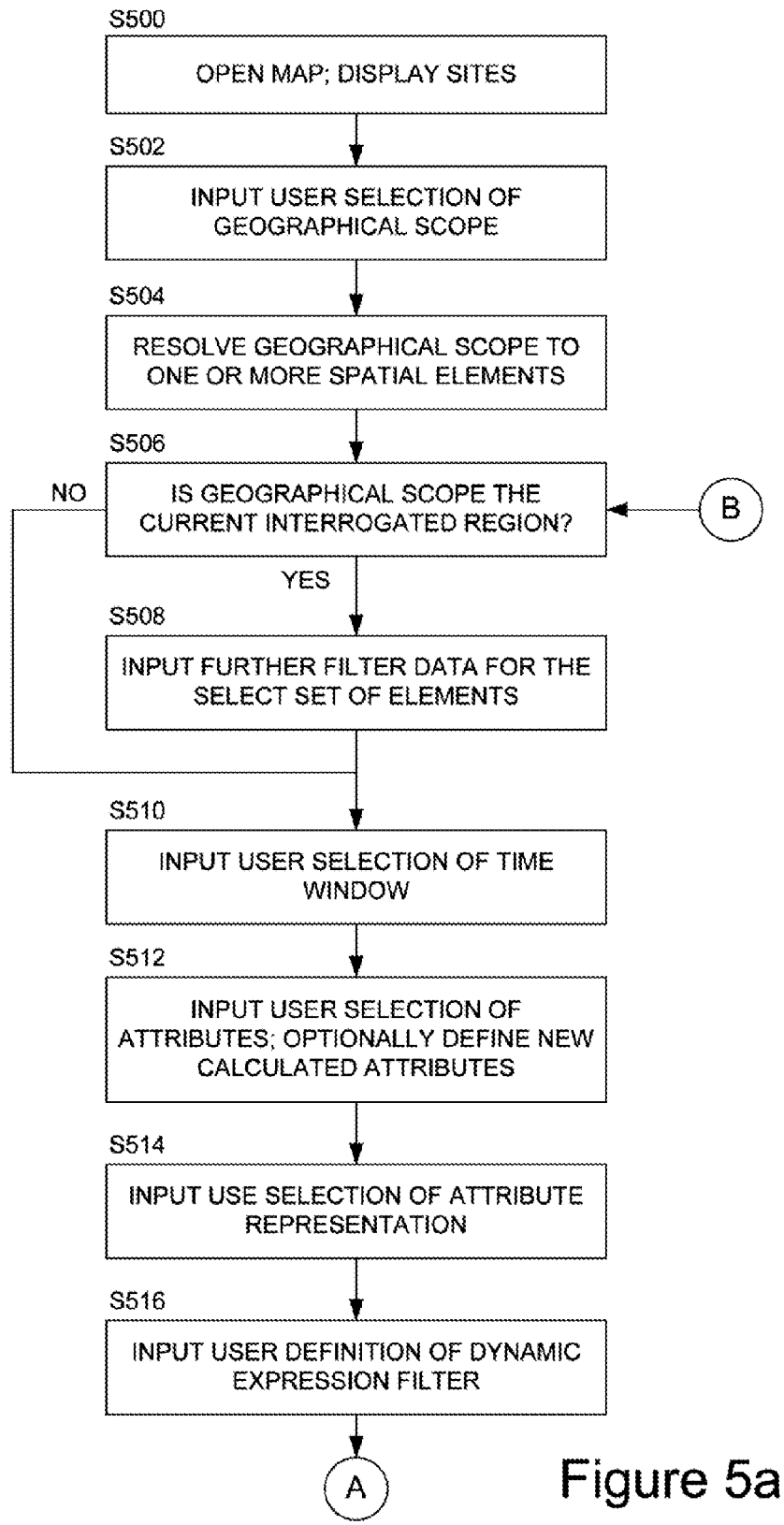
FIG. 5a shows details of a procedure for a querying system, spatial correlation system, and visualisation system, for the arrangement of FIG. 1, and an illustration of layers of the spatial visualisation.

FIG. 5a shows details of a procedure of the general type illustrated in FIG. 4, with further details on visualising correlated data. Thus in an initial step 500 a user interface procedure opens a 2D or 3D map, which may be a third party map and optionally displays RAN element sites in the map. The procedure then inputs a spatial user selection (S502) of a geographical scope for interrogation of the database and resolves this to one or more spatial mesh elements (S504). The user selection of geographical scope may comprise the map displayed on the screen, or an area defined by one or more polygons on the map, or a region defined by distance from a point and/or a region defined by one or more rules or some combination of these which, eventually, resolves to one or more spatial elements for interrogating the database. Optionally the procedure may check (S506) whether the geographical scope is unchanged from a previous iteration, assuming if so that an additional filter/correlation is to be applied to the previously selected spatial data output (S508).

At step S510 the procedure optionally inputs a selection of a time window for the data for playback/aggregation, and at step S512 inputs user selection data for one or more desired attributes for correlation. Again the user has the option of effectively defining new, calculated attributes by entering one or more logical expressions. This provides flexibility in the data visualisation, for example enabling a user to hide an attribute where the data value is less than a threshold or is less than some other data value. One or more attributes may be selected; these may be either continuous or discrete.

The procedure then determines a representation for the selected attributes, for example a user-defined representation either by simply selecting an attribute colour or by employing some more complex expression to define the colour or some other property of a visualised representation of an attribute (step 514). Options for labelling or providing a tooltip for attribute identification and/or drill-down to the underlying data may also be present. Preferably the procedure also allows definition of a dynamic expression filter (step 516), that is a filter defined by an attribute or a combination of attributes which modifies the underlying visualisation. The modification may be applied by filtering, thresholding, alpha blending or in some other manner. In this way, for example, a colour defined by a first attribute can be filtered or given a transparency in accordance with the value of a second attribute. This enables a user to visualise a correlation between the two attributes. It is preferable (but not essential) that the filter is user-adjustable ('dynamic') so that the user can, for example, adjust a degree of transparency by means of a slider or other variable control, which helps in visualising a spatial correlation between two different data attributes.

The preceding steps effectively define a spatial query for database 110; the skilled person will appreciate that the order of the steps may be varied. This spatial query is then resolved into a set of attributes, spatial elements, and optionally time periods (S518), and this is used to retrieve corresponding spatial data values from the spatial integration system 114, more particularly database 110 (step 520). In some preferred implementations the retrieved data is then visualised (S522) in accordance with the previously defined representations (steps 514, 516) for example as an overlay on a 2D or 3D map. For example Google Earth™ may be employed for suitable map data. The visualisation step S522 also applies the previously defined dynamic filter—for example to fade in/fade out or brighten/dim a subscriber account—derived parameter such as a degree of churn.

The visualised spatial correlation shows a correlation between one or more aspects of RAN performance and one or more aspects of subscriber account—derived data over a defined region of interest. Various levels of filtering may be applied within and outside the defined region of interest, and to visualise the attributes within the region of interest. In embodiments the defined region of interest may be as large as federal or state level or the local, for example one or a few zip codes. Once a region of interest has been defined, optionally further filtering (S524) may be applied to the current region of interest, looping back to an earlier point in the procedure such as step 506 (again the skilled person will appreciate that although for convenience steps of the procedure have been expressed in the form of a flow chart, in a user interface options for amending the various parameters of the visualisation will generally be provided by concurrent user controls). Further filtering applied to the selected region of interest may comprise, for example, further filtering of the existing selection of attributes, say to identify the highest 20% of dropped calls of the dropped calls in the selected region of interest, or to apply some threshold to an attribute (for example dropped calls over a 100), or similar. Employing local time in the representation of database also facilitates local-time dependent queries such as selecting only data representing rush hour in the region of interest.

In embodiments the visualisation step 522 also includes a 'smoothing' option to 'blur' the attributes values in one spatial element using values for the same attribute in one or more spatially neighbouring elements. Thus, for example, if a colour rule defines less than 100 dropped calls as green and equal to or greater than 100 dropped calls as red, a set of four grid squares with 99 dropped calls could appear all green. The smoothing process pulls in data from, in embodiments four or nine neighbouring spatial elements, for example so that the attribute value in one grid square has a contribution from a weighted sum of one or more of the neighbouring grid squares. This addresses the aforementioned problem. Many variations on such 'smoothing' are possible relying on, for example, maximum, minimum or average attribute values for a spatial element. Optionally a step of removing outliers can be included in this procedure for increased robustness.

Figures 5A, 5B:
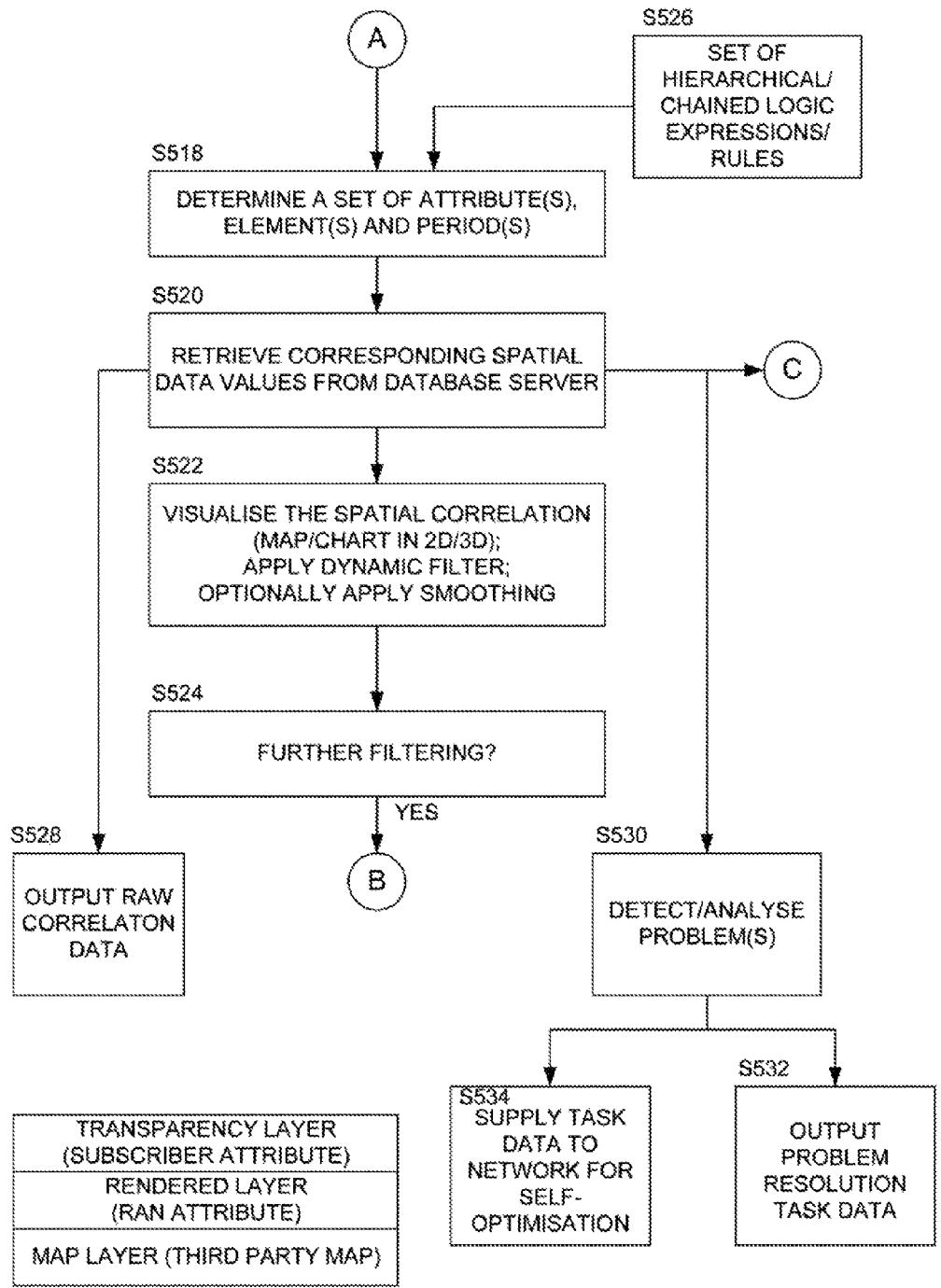
FIG. 5b shows one example of a layered map structure for a visualisation step

FIG. 5b shows one example of a layered map structure for the visualisation step 522, in which an underlying map layer is provided with a layer above in which one or more RAN attributes are rendered, over which a transparency layer is defined, for example, by a subscriber attribute, this top layer having a variable opacity.

Continuing now to refer to FIG. 5a, as indicated by step 526 the input spatial query may be defined by a more complex expression such as a set of hierarchical or chained logic expressions/rules. Similarly the data output need not be visualised but may, for example, comprise a raw data output (S528) or, after application of further expressions/rules, a report, trouble ticket or task definition for the analysed region. Thus the data from the database 110 may be processed to detect/analyse problems (S530), based on one or more rules, and the output of this process used to supply task data for problem resolution to service engineers (S532) or to supply task data directly to the mobile phone network for automated network optimisation (S534).

Broadly speaking, when determining rules for detecting and analysing potential problem areas the overall approach may begin with rules to implement high level checks on relatively high level attributes, for example dropped or blocked voice calls or low throughput or interference and these high level rules can then be employed to identify areas of the region of interest for additional analysis of the underlying attribute data. This lower level attribute data from the areas with actual or predicted problems can be used to construct a matrix of data which can then be processed, for example by further rules, to identify fault signatures and hence potential diagnosis and resolution. Thus in embodiments of the system additional data comprising a multi-dimensional array of fault signatures may also be stored for implementation of fault diagnosis and automated problem resolution. Optionally predicted problems may also be prioritised, for example dependent upon age and/or seriousness (type of problem and/or degree of predicted problem/number of events). The task priority may be employed to queue a task for output. The task data output at step 532 may include one or more of attribute/spatial identifying the problem, attribute/spatial data/other data identifying a likely diagnosis, data identifying implementation of a solution, and priority data.

The skilled person will appreciate that many different types of rules may be defined and implemented at different points in the procedure of FIG. 5a. For example a simple rule may define upper and/or lower bound thresholds for a monitored counter or, in a more complex example, a defined deviation from a historical average qualified by a threshold. Similarly simple or complex KPIs may be defined—for example a simple dropped calls KPI may be defined by a ratio of a counter for dropped calls to a counter for successful calls. Rules may be defined to operate on both RAN performance and subscriber account data, and to group the corresponding outputs. Further examples of rules which may be applied to attributes include delta checks, threshold checks and optionally audit checks (for network configuration discrepancies). Because the data in the database 110 is geospatial data these rules may incorporate spatial requirements and/or may define or require spatial correlations among the identified attributes.

The skilled person will appreciate that there is a wide variety of tasks which may be applied to a mobile phone network in order to address identified problem areas including, but not limited to: traffic shaping, neighbour tuning, retuning/frequency plan optimisation, adhoc parameter changes (for example change in timers), antenna changes (potentially using automatic/remote antenna control units), site configuration changes, and the like. Potentially, particularly in a semi-automated system, multiple different changes may be tried, for example substantially at random, and the optimum choices then selected ('simulated annealing'). One network configuration change of particular interest is that of adding an additional base station, for example a picocell, femtocell base station. Such an approach is particularly helpful in addressing the needs of high value subscribers who might otherwise deactivate their accounts.

Bringing subscriber account data into the system enables such VIP accounts to be identified and these techniques to be employed; this is not hitherto impossible.

By way of a more detailed example, an automatic mobile phone network optimisation system may employ a workflow engine of the type previously described in our U.S. Pat. No. 7,941,136 to operate on spatial data values from database 110. This is illustrated in FIG. 6, which shows a recapitulation of some of the techniques described in our US'136.

Figure 6:
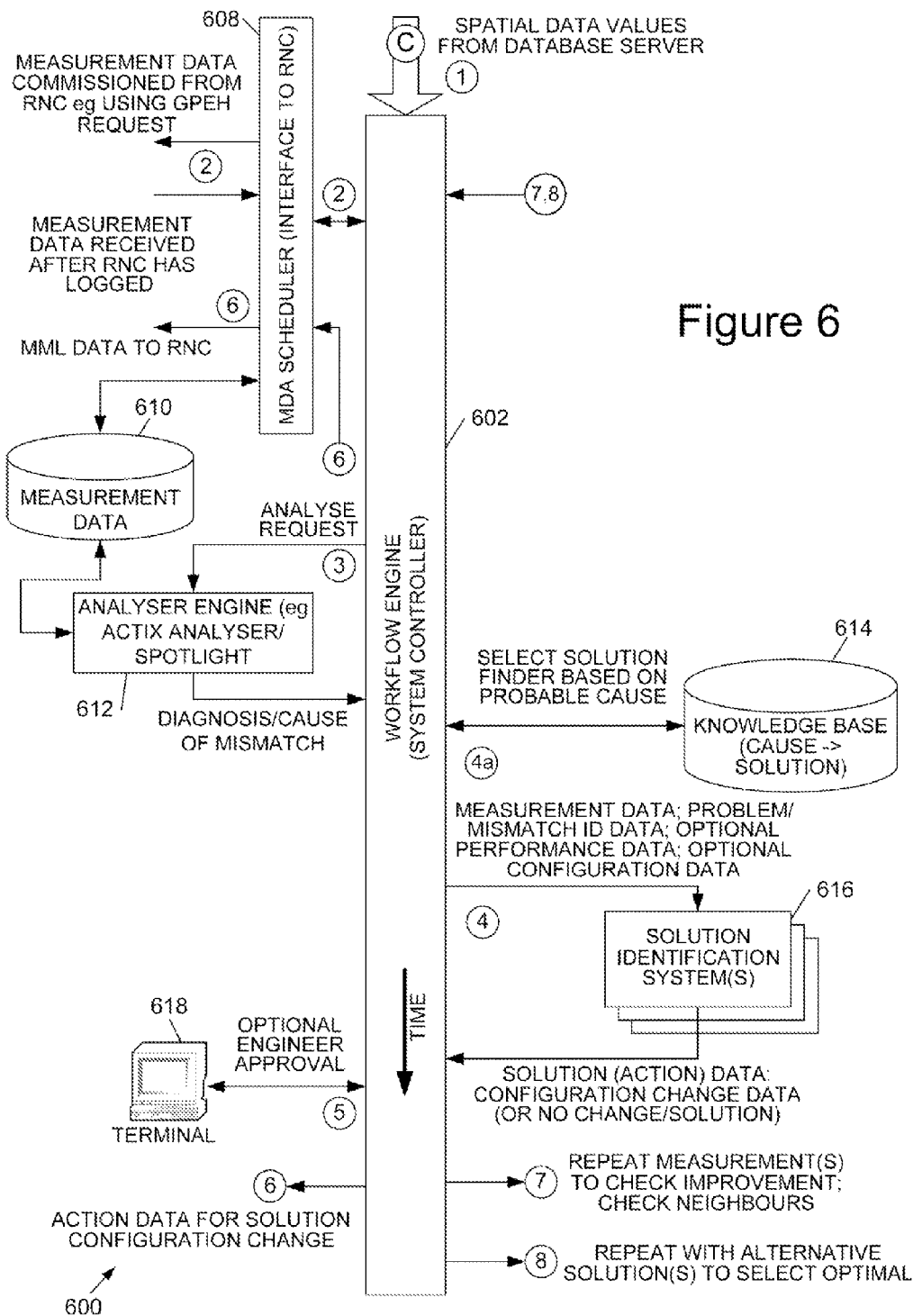
FIG. 6 shows a block diagram of an automated mobile phone network performance optimisation system for use with the system at FIG. 1.

Referring to FIG. 6, this shows a mobile phone network optimisation system 600 according to an embodiment of the invention. The system comprises a workflow engine 602 which acts as the system controller, coupled to a rules engine 604 which acts to identify a performance problem/mismatch and to identify information relevant to this which should be collected in order to diagnose the cause. The rules engine may be part of an automated performance management system (Actix Insight) 606; this receives performance data such as .CSV files exported from OSS, PM, planning tools and the like. The workflow controller 602 is also coupled to an interface 608 to the network, in embodiments at the RNC-level. Interface 608 may be implemented by a further rules engine to translate a requirement for measured information to appropriate commands to the network to commission switch-based measurements to obtain the desired data. Conveniently, the MDA (measured data analysis) Scheduler of the Actix CellOpt Automatic Cell Planning System may be employed; this couples to a wide range of mobile phone networks and enables measurements to be commissioned and measurement results to be input.

The system 600 also includes a database 610 for storing measurement data obtained from the network and for making this data available to other systems, in particular analyzer engine 612. Analyzer engine 612 is also coupled to workflow engine 602a and provides facilities for post-processing captured measurement data; a preferred example is Actix Analyzer™, in combination with Actix Spotlight™. A knowledge base 614 is also coupled to workflow engine 602, storing information to link a diagnosed cause of a performance mismatch with information identifying an appropriate solution identification system. Thus one or more solution identification systems 616 are coupled to workflow engine 602 and receive measurement (and other) data from the workflow engine (or directly from measurement database 610). An engineer terminal 618 may also be provided for obtaining engineer approval of a proposed network configuration change.

Workflow engine 602 schedules operations in the numerical sequence indicated by the numbers within circles, time generally flowing from the top towards the bottom of the diagram. Thus at stage 1 system 100 identifies a problem with the network or a mismatch between desired and actual performance. identifies desirable measurement data for diagnosing the problem and passes this information to the workflow engine 602 which in turn, via MDA scheduler 608 then commissions appropriate measurement data from the RNC, for example using a GPEH request. At stage 2 measurement data is commissioned from the network and received back from the network, and stored in database 610 where, at stage 3, it is processed by analyzer engine 612 to determine one or more probable causes of the problems/mismatch. Optionally, at stage 4a, an appropriate solution identification system may be chosen dependent on the suspected cause of the problem. Then, at stage 4, measurement data, data identifying the problems or mismatch and, optionally, performance data and current configuration data are provided to one or more solution identification systems, which in turn output data identifying a solution, that is an action/configuration change to be implemented. Engineer approval for the change may be obtained at stage 5 via terminal 618 and then workflow engine 602 provides the data for the configuration change to MDA scheduler 608 which, in this example, provides data for the configuration change as MML commands to one or more RNCs.

System 600 may be a closed loop system, so that once a configuration change has been made further measurement data is collected to check that there has been an improvement in network performance, a further closed loop, 7, then checking neighbours and, preferably, neighbours' neighbours of cells to which the configuration change has been applied, to check that the configuration change has not caused any substantial deterioration in network performance outside the area to which the configuration change has been applied. Optionally a still further closed loop, 8, may successively try a number of alternative solutions to find the best.

Figure 7:
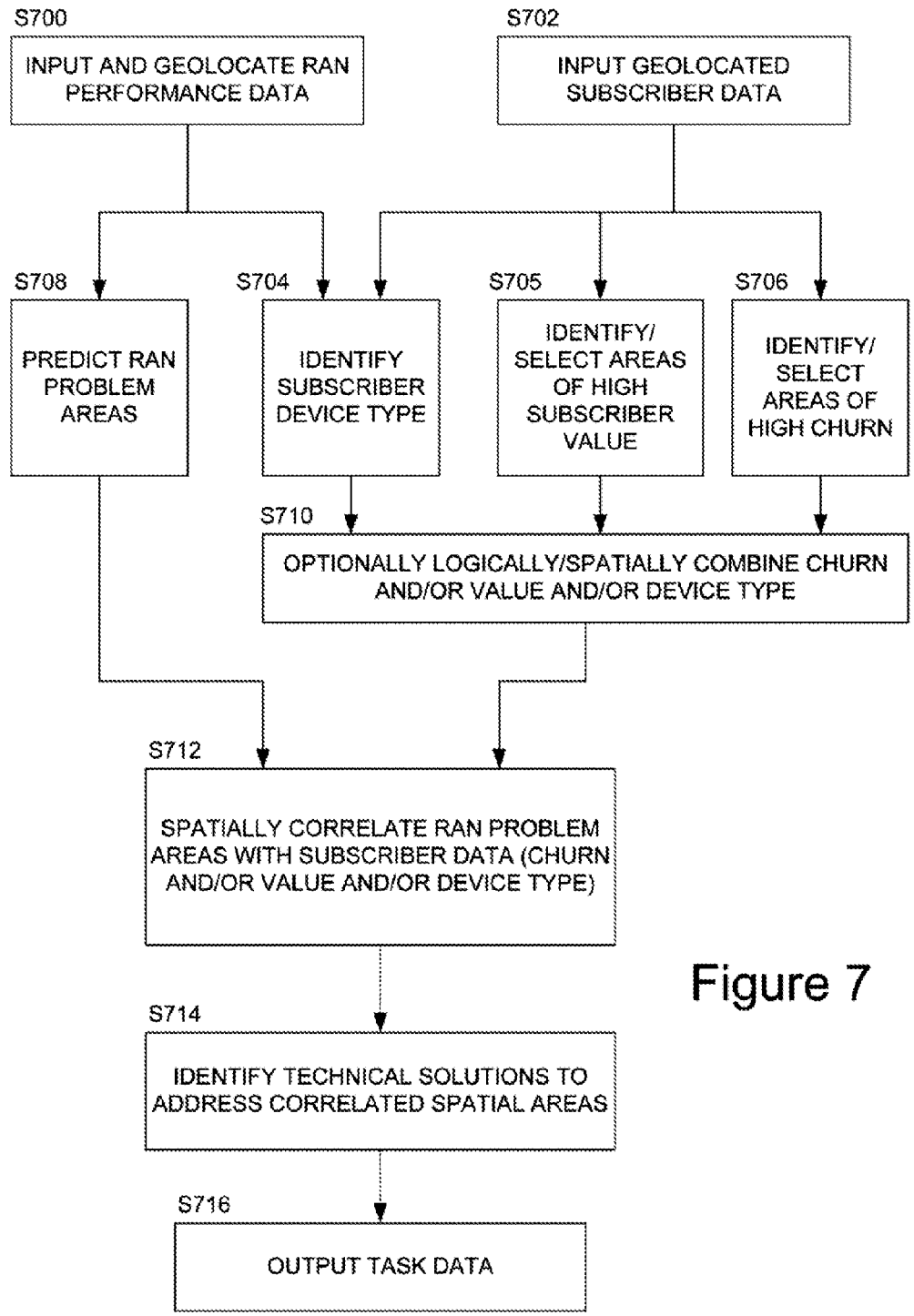
FIG. 7 shows a flow diagram of a procedure for combining geolocated RAN performance data with subscriber account data to identity problem spatial areas, according to an embodiment of the invention.

Referring next to FIG. 7, this illustrates a flow diagram of an example procedure according to an embodiment of the invention which combines subscriber data with geolocated RAN performance data to provide solutions to some particularly difficult RAN problems. Thus in step 700 the procedure inputs and geolocates RAN performance data and, correspondingly, at step 702 inputs geolocated subscriber data. These two sets of data are combined (S704) to identify subscriber device type. Additionally the subscriber data is employed to identify areas of high subscriber value (S705) and/or areas of high churn (S706) alongside this the RAN data is employed to predict RAN problem areas (S710). One or more of predicted/actual high subscriber churn, high subscriber value, and device type may be combined logically and spatially (S708) and the result (and/or any of the preceding data) is then combined with the spatial data representing the predicted RAN problem areas and these two data sets are spatially correlated (S712).

The procedure may end here, for example locating high value subscribers with predicted problems or the procedure may continue and suggest technical solutions to address the correlated problem spatial areas (S714), outputting corresponding task data (S716) as previously described.

Embodiments of this method and the previously described system are thus able to provide data representing real subscriber user experience, providing geographical data both in report form and visualised. This in turn enables embodiments of the method/system we describe to:

Identify subscribers who are likely to churn

Identify subscribers who require in-home/business repeaters

Validate reasons for subscribers who churned historically

Identify locations of businesses and/or apartment complexes with poor coverage and with large numbers of subscribers Identify subscribers with problematic devices Visualise geographical network performance before and after configuration changes, for example the day before compared with the day after Reduce drive testing requirements for planned RAN network development Perform VIP traces of key subscribers and/or complaining subscribers and identify the reason, technically, for the (potential) complaint.

In one embodiment of an automated system/method one output of the system is a list of subscriber identifiers for subscribers requiring base stations, repeaters or similar. More generally embodiments of the system/method enable technical resources to be focussed on high value subscribers, either individual subscribers of high value and/or spatial collections of subscribers who, in aggregate, are high value.

Figure 8A:
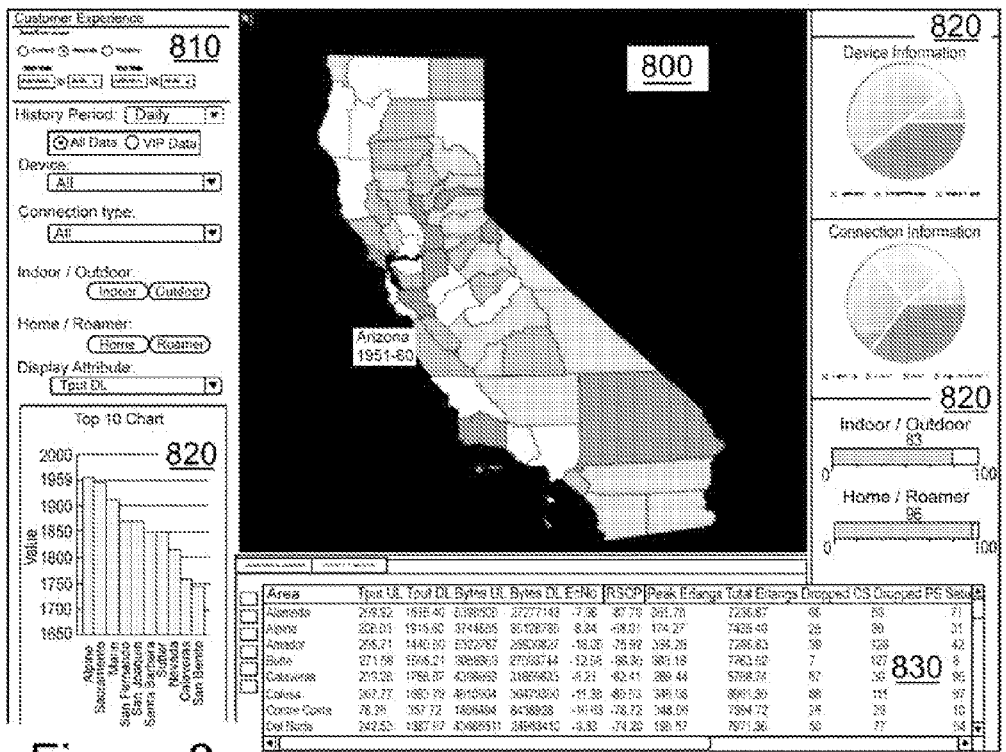
FIGS. 8a to 8g show example representations of geolocated RAN performance data.

FIG. 8a shows one example of a high level visualisation of RAN performance data, for the US state of Arizona. The display has a map region 800, a user interface region 810 to enable the user to select, in this example, a history period, device type, connection type, in door/outdoor use type, home/roamer subscriber type, and display attributes. The user interface also illustrates the graphical output of the display in the form of various charts and other graphical representations 820, as well as a table region 830 showing some of the underlying data. In the example of FIG. 8a the user interface provides a national view of customer experience with area drill down capability, and allows performance to be segmented by any combination of handset type, call type (voice and data). Indoor versus outdoor and roaming versus home.

Figure 8B:
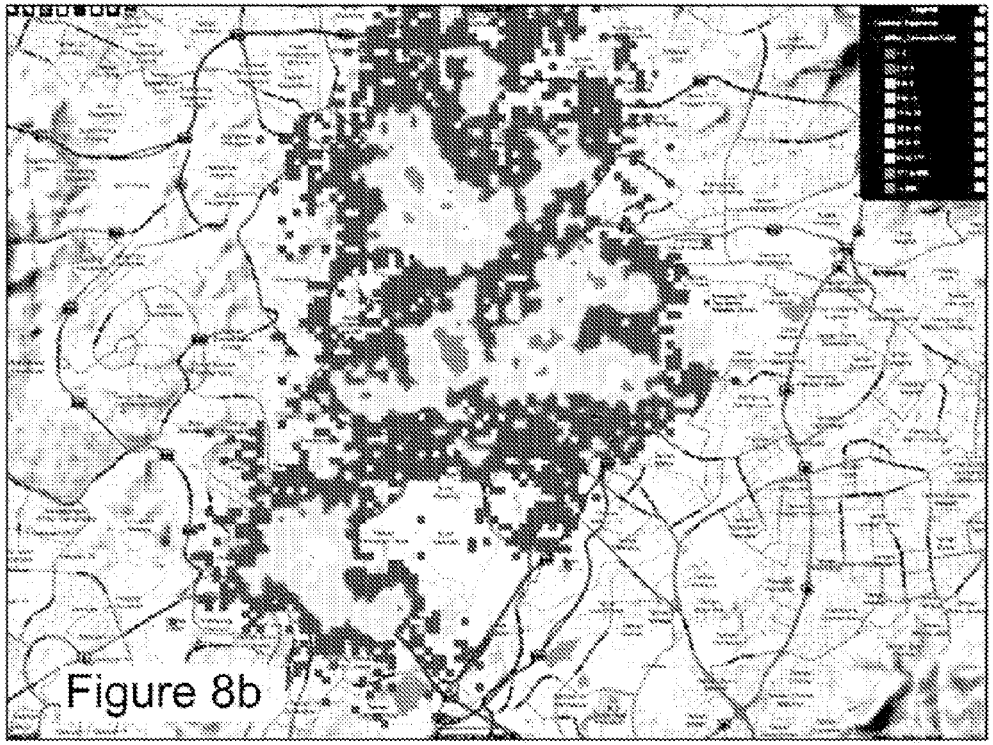
Figure 8C:
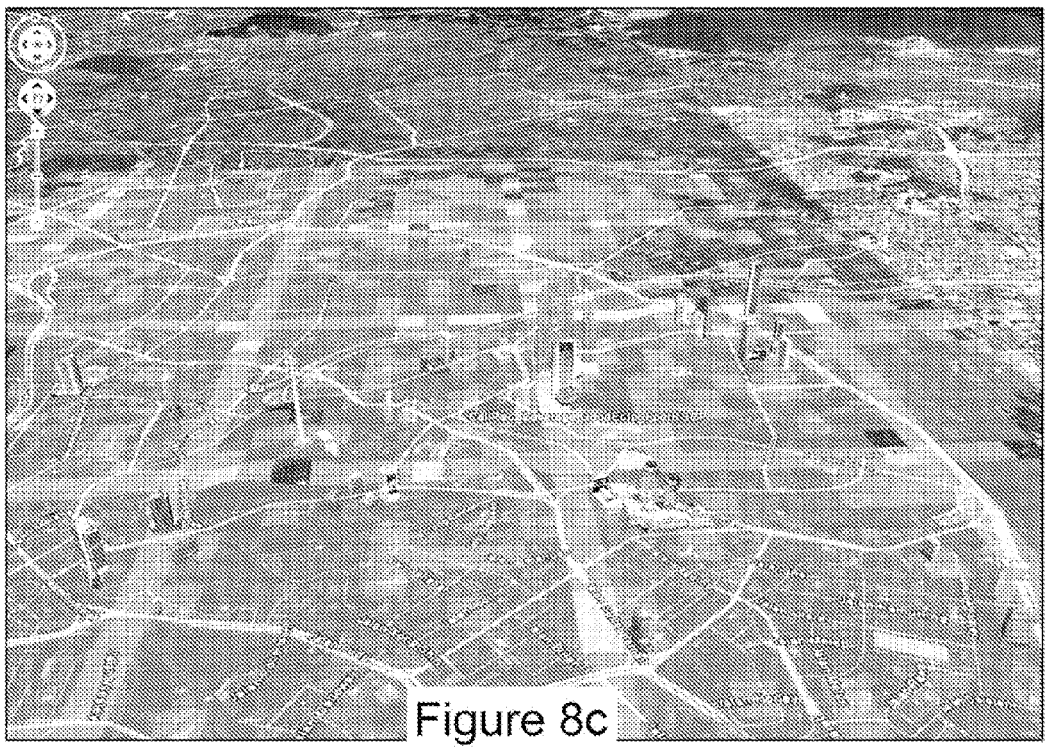

FIG. 8b shows example geolocated RAN performance data showing a 2D map enabling the identification of congestion hot spots, quality of service issues, and network problems. A representation of this type is able to, for example, display the locations of congestion-related drops which are impacting iPhone subscribers who are using data'. Again tabular and chart view of the data are also available, to facilitate ranking and prioritisation. FIG. 8c shows a similar visualisation in 3D, facilitating the use of additional geographic context in RAN optimisation and troubleshooting.

Figure 8D:
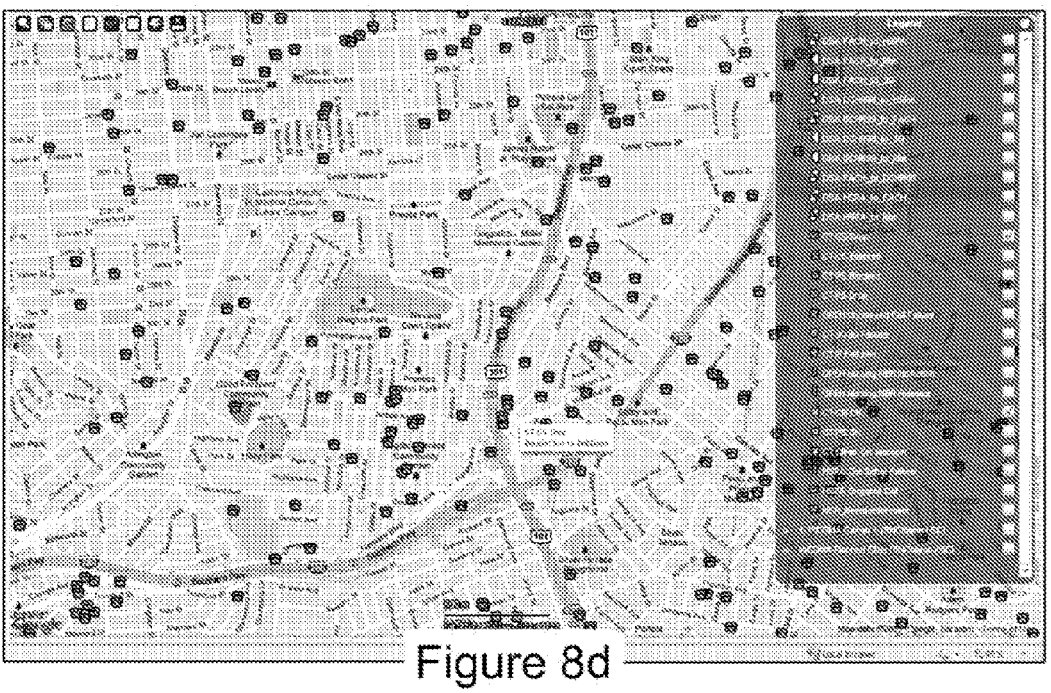
Figure 8E:
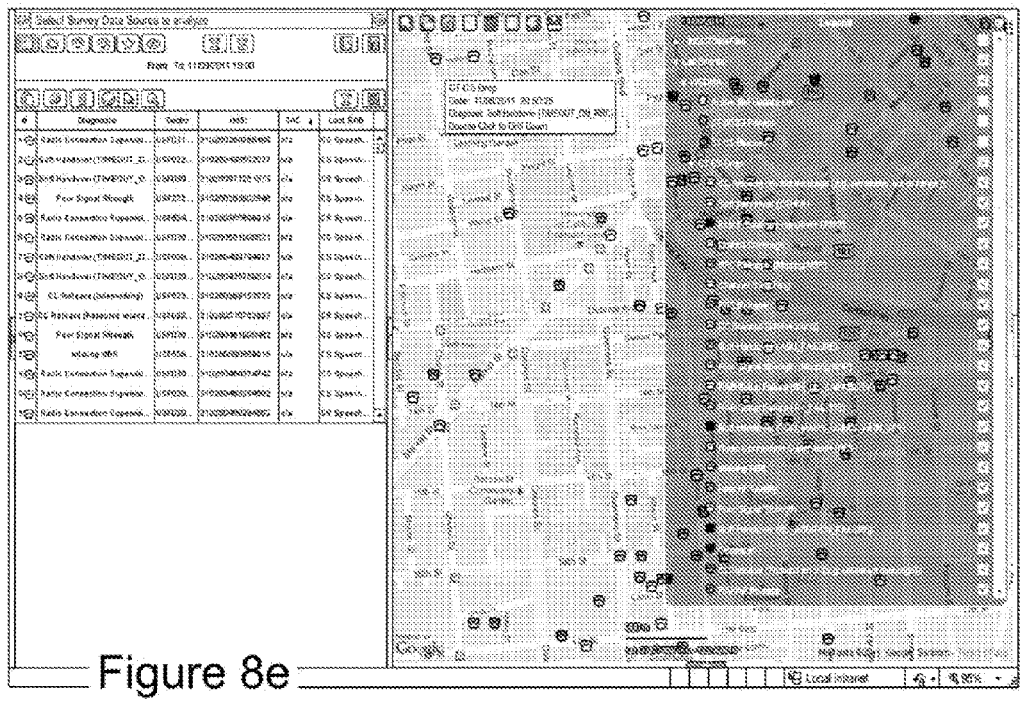
Figure 8F:
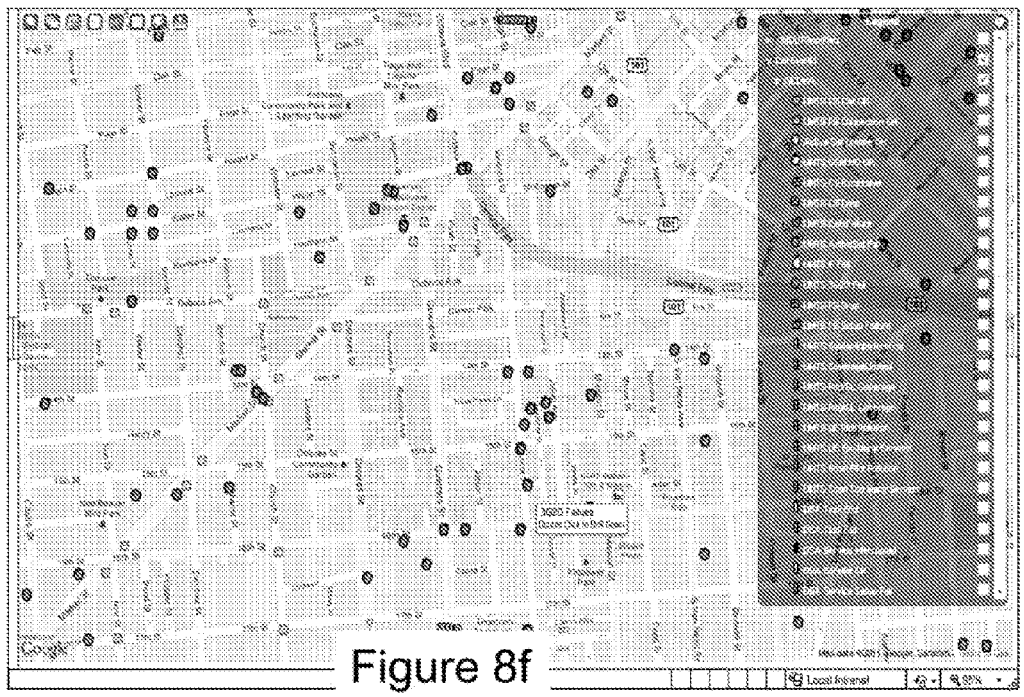
Figure 8G:
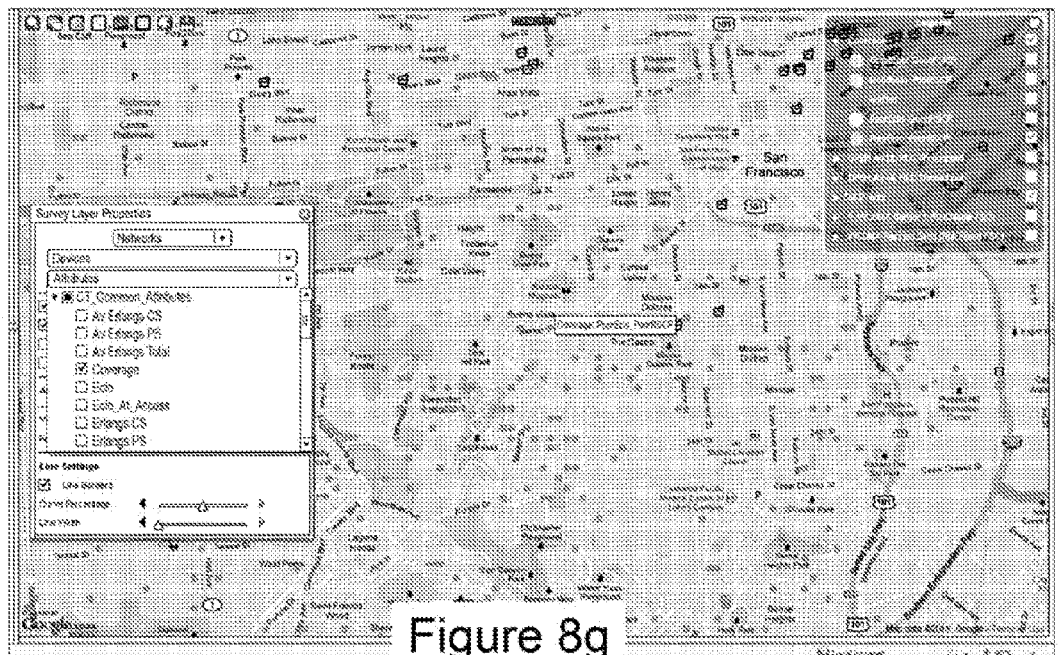

FIGS. 8d to 8g show further examples of 2D visualisation of the spatial variation of KPIs of RAN network performance. Thus, for example, FIG. 8d illustrates a spatial distribution of voice drop locations with selectable icons for different voice drop reasons. FIG. 8e shows a detailed spatial breakdown of voice drop regions in this example as both a 2D map and a table. FIG. 8f shows spatial variation of failure to handover to GSM again with a range of selectable icon types. FIG. 8g shows spatial variation in RAN network coverage quality, again illustrating a user interface providing selectable survey layer properties and a user-configurable graphic output. The skilled person will appreciate that many other forms of RAN performance data may be mapped in this way including for example (but not limited to): throughput, signal strength (RSCP), interference level (EcIo), locked voice calls, and so forth.

Figure 9:
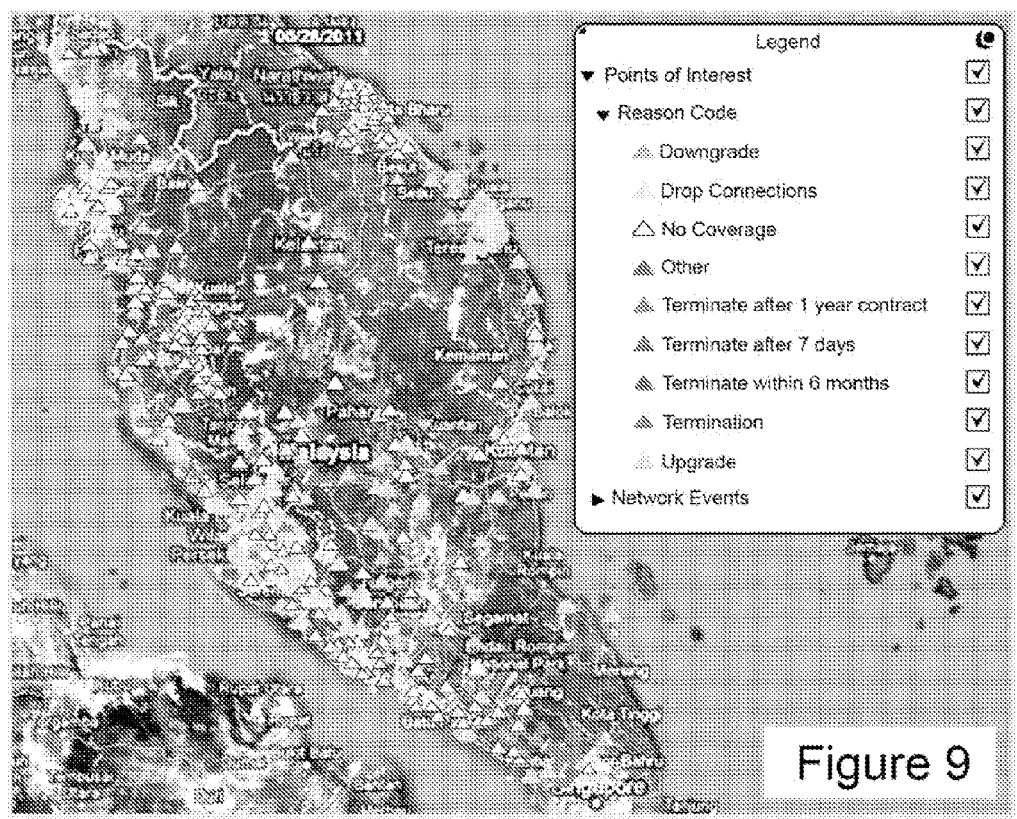
FIG. 9 shows a high level example of geolocated subscriber account data.

FIG. 9 shows a graphical visualisation of geolocated subscriber account data, colour coding the (aggregated) data with reasons for churn including, in this example: downgrade, dropped connections, no coverage, other, termination after one year contract, termination after 7 days, termination within 6 months, termination and upgrade. It will be appreciated that some of these are technical, RAN-related and some relate to financial/other reasons. The example of FIG. 9 shows the output of a user-definable filter defined as ('Field=Churn'>0' or 'Field=complaints'>0); call failures may be quickly filtered by INSI for quick diagnosis of customer complaints. More particularly the import of churn and customer complaint records may be combined with call-trace data as previously described to enable churn/complaint hotspots to be identified and the impact of radio network performance/quality of service to be established, and optionally future impact to be predicted.

Figure 10A:
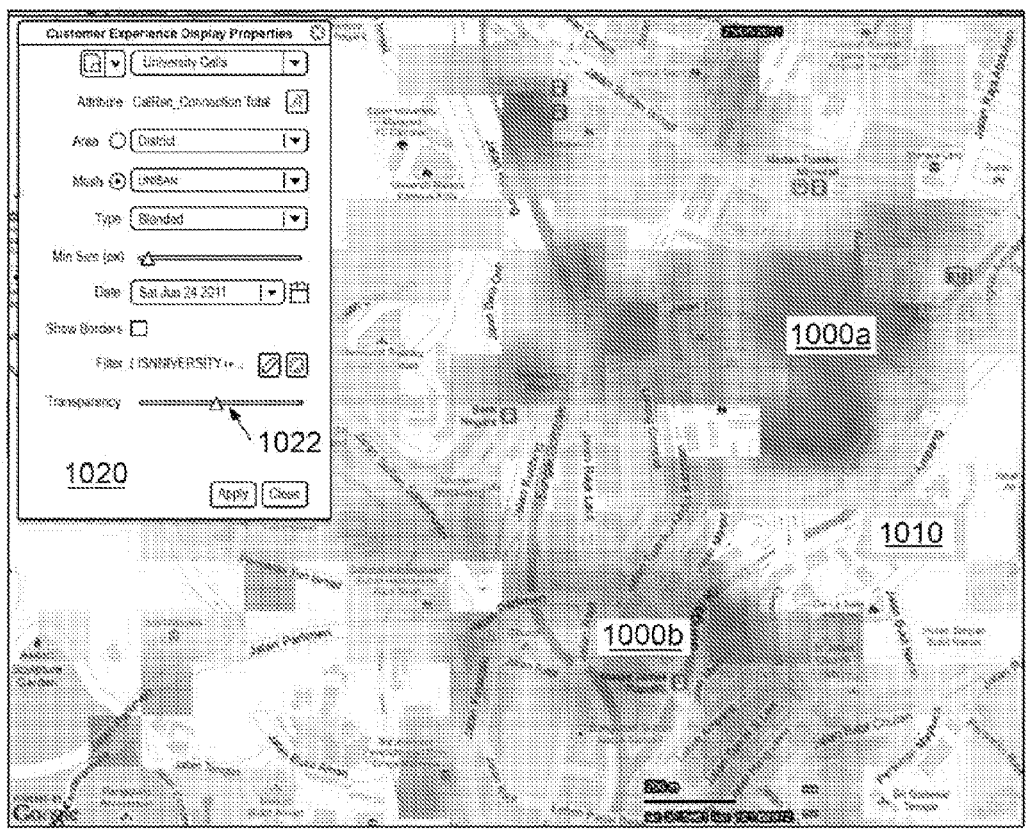
FIGS. 10a and 10b show example visualisations of correlations between geolocated RAN performance data and subscriber account data.

FIG. 10a shows an example visualisation of a spatial correlation between subscriber account data and RAN performance data, illustrating the result as a coloured heat map with variable transparency. Thus FIG. 10 shows regions of poor RAN subscriber experience (quality of service) 1000 (coloured red), and regions of good subscriber experience 1010 (coloured green). In the illustrated example one of the poor experience areas 1000a has a relatively high subscriber value density and is thus a relatively non-transparent red whereas a second area 1000b of poor subscriber experience has a relatively lower subscriber value density and is therefore more transparent and less obtrusive. In this way spatial correlation between the various attributes can be readily discerned. FIG. 10a also illustrates an example user interface 1020 illustrating a selected attribute and showing a user-adjustable transparency slider 1022. A visualisation of the type shown in FIG. 10a enables network performance and customer experience in key locations to be traced and in particular, enables a user to visualise how the network supports critical high subscriber value locations such as corporate offices, retail stores, transport links and the like.

Figure 10B:
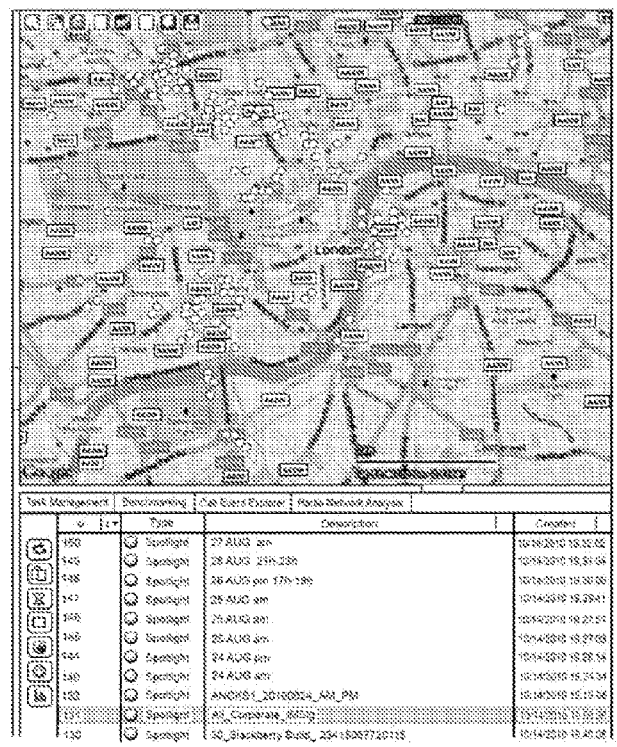

FIG. 10b illustrates another example of a spatial correlation between subscriber accounts data and RAN performance data. In this example the duty map is overlaid with data indicating the location of VIP call failures, providing immediate visibility into where the problems are occurring and into their underlying cause. This facilitates proactive management of VIP subscriber experience rather than merely reacting to complaints, although such a spatial correlation also helps in diagnosing the underlying reasons for subscriber complaints.

Figure 11:
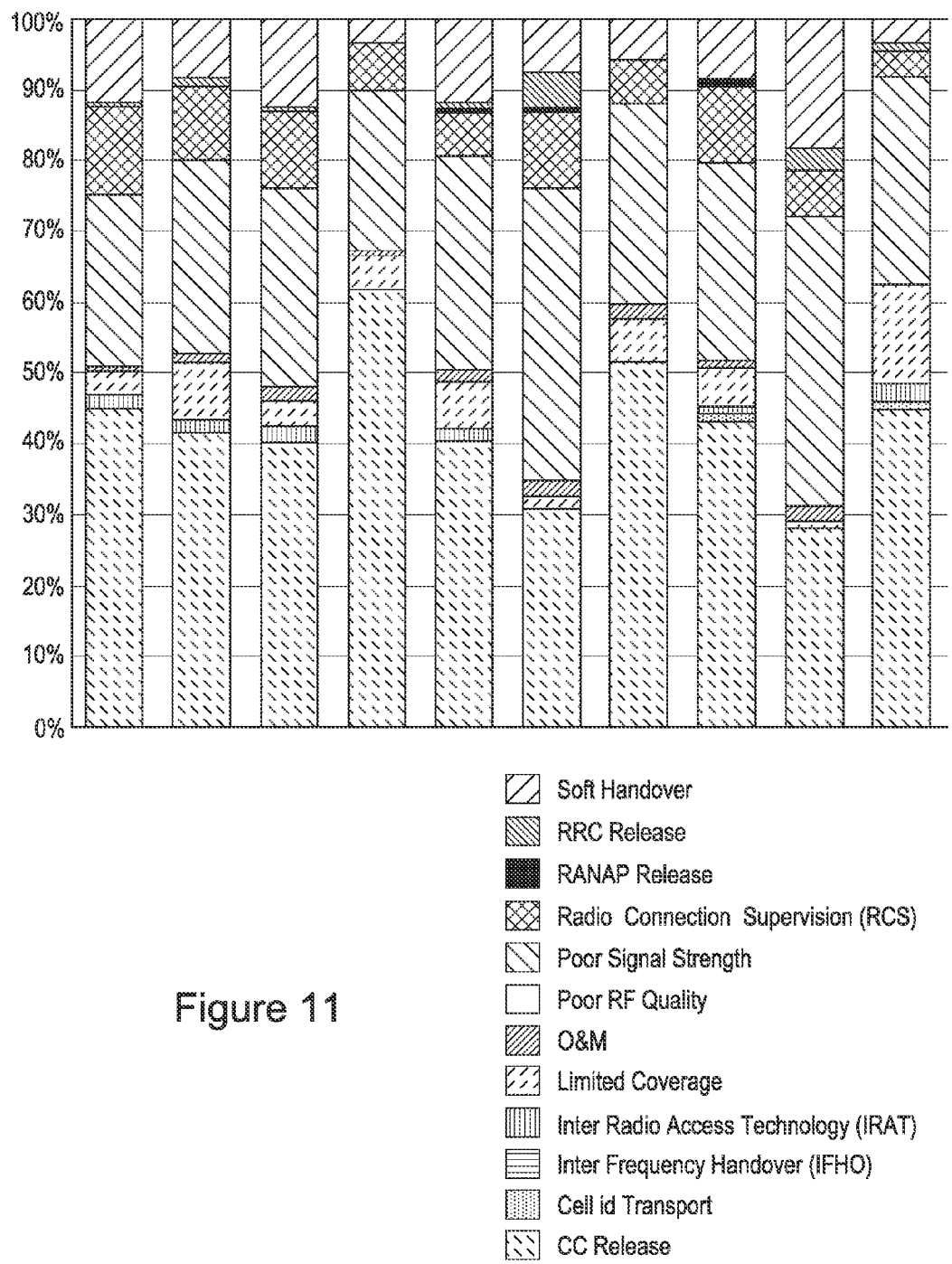
FIG. 11 shows an example of hand-set type specific data for a selected spatial region.

FIG. 11 shows one example of a device type-dependent data extracted from a defined spatial region of another phone network using the combination of subscriber data and RAN performance data. The bar chart of FIG. 11 illustrates the top ten worst handsets based on circuit switch drops, each bar representing a different type of handset, the bars being subdivided according to the reason for the CS drops (soft-handover, RRC release, RANAP release, Radio Connection Supervision (RSC), poor signal strength, poor RF quality, O & M, limited coverage, Inter Radio Access Technology, IRAT, Inter Frequency Handover, IFHO, Cell ID Transport, CC release. Such handset ranking reports facilitate identification of problem handsets based on dropped call rate and RF measurements.

The skilled person will appreciate that many types of phone, smartphone, and other mobile computing devices may be coupled to a mobile phone network, and that the techniques described herein are not limited to the use of any particular types of devices on the network.

The skilled person will also understand that the above-described techniques are applicable to all major wireless standards, including 2G (GSM, CDMA, iDEN), 2.5G (GPRS, EDGE) 3G (UMTS, HSDPA, HSUPA, CDMA-1X & EVDO), LTE and 4G (WiMAX, TDD) technologies and beyond, as well as to heterogeneous networks including, for example, WiFi.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A system for maintaining or optimising a mobile phone network, the system comprising:
   a plurality of data feeds including:
   at least one radio access network (RAN) data feed to receive RAN performance data relating to performance of a radio access network of said mobile phone network over a period of time;
   wherein said RAN performance data is associated with RAN performance geolocation data, and wherein said RAN performance data and said RAN performance geolocation data together comprise data defining variation in performance of said RAN over a spatial region of coverage of said RAN;
   at least one subscriber account data feed to receive subscriber account data defining one or more parameters of subscriber accounts of said mobile phone network;
   wherein said subscriber account data includes subscriber account geolocation data defining physical locations of said subscriber accounts within said region of coverage of said RAN;
   a spatial data integration system coupled to said data feeds and configured to combine said RAN performance data, said RAN performance geolocation data, said subscriber account data, and said subscriber account geolocation data into an integrated spatial data structure, wherein said integrated spatial data structure is indexed by at least a spatial element identifier and an attribute identifier, said spatial element identifier identifying a geospatial element of said spatial region of coverage of said RAN, said attribute identifier identifying an attribute of said geospatial element, wherein said attribute comprises one or both of an attribute of said RAN performance derived from said RAN performance data and an attribute relating to said RAN performance derived from said subscriber account data; and a querying system, coupled to said spatial data integration system, to receive a spatial query defining a set of said attributes and elements, and in response to query said spatial data integration system and to output response spatial data, wherein said response spatial data comprises data for attributes and geospatial elements comprising at least one said attribute of said RAN performance derived from said RAN performance data and at least one said attribute relating to said RAN performance derived from said subscriber account data; and a spatial correlation system, coupled to said querying system, to correlate said attribute of said RAN performance derived from said RAN performance data and said attribute relating to said RAN performance derived from said subscriber account data, over a spatial region defined by said geospatial elements of said response spatial data.

2. The system as claimed in claim 1, wherein said spatial correlation system comprises a system to process said response spatial data such that, in said spatial region defined by said geospatial elements, a value of at least one of said attributes is determined from values of said at least one attribute in a plurality of neighbouring said geospatial elements in said response spatial data.

3. The system as claimed in claim 1, wherein said spatial correlation system comprises a data visualisation system configured to visualise a combination of said at least one attribute of said RAN performance derived from said RAN performance data and said at least one attribute relating to said RAN performance derived from said subscriber account data, on a shared geospatial map.

4. The system as claimed in claim 3, wherein said shared geospatial map is a 3D map including one or both of a terrain of a spatial region defined by said geospatial elements and buildings within said spatial region defined by said geospatial elements.

5. The system as claimed in claim 3, wherein said data visualisation system is coupled to said querying system and comprises a visual query tool, wherein said visual query tool is configured to input said spatial query, said spatial query defining a region of said shared geospatial map, and to convert said spatial query into a list of said geospatial elements for querying said spatial data integration system.

6. The system as claimed in claim 5, wherein said querying system is further configured to receive second tier query data for a second tier query defining one or more filter parameters, and wherein said system is configured to filter said output response spatial data for said list of said geospatial elements by said one or more filter parameters.

7. The system as claimed in claim 3, wherein said spatial correlation system is configured to display said attributes of said response spatial data as overlaid image effects on said shared geospatial map.

8. The system as claimed in claim 7, wherein said attribute of said RAN performance derived from said RAN performance data and said attribute relating to said RAN performance derived from said subscriber account data define, respectively, image effects comprising first and second image regions overlaid on said shared geospatial map, and wherein one of said first and second attributes defines a transparency of one of said image regions.

9. The system as claimed in claim 8, further comprising a user interface to enable user-adjustment of said transparency to adjust a degree of visual correlation of said attributes.

10. The system as claimed in claim 7, wherein said spatial correlation system is configurable to define an adjustable filter comprising an expression for processing one or both of said attribute of said RAN performance derived from said RAN performance data and said attribute relating to said RAN performance derived from said subscriber account data, and wherein said system is configured to evaluate said expression to determine a said image effect to apply.

11. The system as claimed in claim 1, wherein said spatial correlation system is configured to process said correlated attributes to locate one or more problem spatial areas of said spatial region, wherein said problem spatial areas are defined by said geospatial elements in which mobile devices are predicted to have an RAN-dependent performance problem.

12. The system as claimed in claim 11, further comprising a network performance optimisation system, coupled to said spatial correlation system to process said correlated attributes to identify, for said predicted problem spatial areas of said spatial region, one or more tasks for optimising said performance of said RAN in said problem spatial areas, and to output problem resolution data defining said one or more tasks to be implemented on said RAN to improve a performance of said RAN in said problem spatial areas.

13. The system as claimed in claim 12, configured to output said problem resolution data to said mobile phone network for automated resolution of a predicted RAN performance problem.

14. The system as claimed in claim 1, further comprising a rules engine to operate on one or both of data output from said spatial data integration system and data output from said spatial correlation system, in accordance with a set of rules, and to output data for identifying problem spatial areas of said RAN.

15. The system as claimed in claim 1, wherein said subscriber account data comprises a parameter defining a deactivation event for the subscriber account.

16. The system as claimed in claim 1, wherein said subscriber account data comprises a parameter defining subscriber complaint relating to performance of said RAN.

17. The system as claimed in claim 1, wherein said subscriber data comprises data identifying a value of a subscriber account, wherein said spatial correlation system is configured to select said attribute of said RAN performance derived to process, and wherein said selection is responsive to said identified values of said subscriber accounts.

18. The system as claimed in claim 1, wherein said RAN performance data comprises data defining variation said performance of said RAN over time;
   wherein said spatial data structure of said spatial data integration system is indexed by at least one time-dependent identifier;
   wherein said spatial query further defines a time or time period; and
   wherein said spatial correlation system is further configured to correlate said attributes for said time or time period.

19. The system as claimed in claim 18, wherein said RAN performance data comprises data indexed by universal time, and wherein said spatial data integration system is configured to convert said universal time of said RAN performance data to a local time for a corresponding spatial region to which said RAN performance relates, wherein said local time is determined from said RAN performance geolocation data.

20. The system as claimed in claim 1, wherein said RAN performance data comprises data indexed by universal time, and wherein said spatial data integration system is configured to process data from said data feeds at times dependent on a longitude coordinate of said RAN performance geolocation data.

21. The system as claimed in claim 1, wherein said subscriber account data includes subscriber identifier data for a subscriber, wherein said RAN performance data includes a first type of data item associated with a subscriber identifier and a second type of data item associated with both a subscriber identifier and an equipment identifier, wherein said equipment identifier includes data defining a type of mobile device to which said second type of data item relates; wherein said spatial data integration system is configured to link said first type of data item associated with said subscriber identifier to said second type of data item associated with both said subscriber identifier and said equipment identifier; and wherein said querying system is able to query said spatial data integration system by said type of mobile device for correlating said attributes for a selected said type of mobile device.

* * * * *